(12) United States Patent
Sapek

(10) Patent No.: US 8,694,578 B2
(45) Date of Patent: Apr. 8, 2014

(54) SWARM-BASED SYNCHRONIZATION OVER A NETWORK OF OBJECT STORES

(75) Inventor: Adam Sapek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 12/474,716

(22) Filed: May 29, 2009

(65) Prior Publication Data

US 2010/0306280 A1   Dec. 2, 2010

(51) Int. Cl.
| G06F 15/16 | (2006.01) |
| G06F 15/173 | (2006.01) |
| G06F 7/00 | (2006.01) |
| G06F 17/30 | (2006.01) |

(52) U.S. Cl.
USPC ........... 709/203; 709/218; 709/219; 709/226; 709/248; 707/702; 707/770; 707/802; 707/804; 707/805

(58) Field of Classification Search
USPC .......... 709/203, 218–219, 226, 248; 707/704, 707/770, 802–805
See application file for complete search history.

(56) References Cited

U.S. PATENT DOCUMENTS

| 2004/0168174 | A1 | 8/2004 | Baker |
| 2004/0172423 | A1 | 9/2004 | Kaasten |
| 2005/0262371 | A1 | 11/2005 | Luke et al. |
| 2006/0212592 | A1 | 9/2006 | Gupta |
| 2006/0239275 | A1 | 10/2006 | Zlateff |
| 2007/0005694 | A1 | 1/2007 | Popkin |
| 2007/0136449 | A1 | 6/2007 | Da Palma |
| 2007/0177511 | A1 | 8/2007 | Das |
| 2008/0059656 | A1 | 3/2008 | Saliba et al. |
| 2008/0235331 | A1 | 9/2008 | Melamed |
| 2009/0276543 | A1* | 11/2009 | Turner et al. ................. 709/248 |
| 2009/0313310 | A1* | 12/2009 | Thome et al. ................. 707/203 |
| 2011/0010421 | A1* | 1/2011 | Chavez et al. ............... 709/204 |

FOREIGN PATENT DOCUMENTS

| CN | 1722731 A | 1/2006 |
| CN | 102449616 | 5/2012 |
| JP | 06139208 A | 5/1994 |
| WO | 2006070071 A1 | 7/2006 |
| WO | 2010138668 A2 | 12/2010 |

OTHER PUBLICATIONS

"International Search Report", Mailed Date: Jan. 28, 2011, Application No. PCT/US2010/036323, Filed Date: May 27, 2010, pp. 10.

(Continued)

*Primary Examiner* — David Lazaro
*Assistant Examiner* — Farzana Huq
(74) *Attorney, Agent, or Firm* — Bryan Webster; Andrew Sanders; Micky Minhas

(57) ABSTRACT

An object set may be redundantly stored by a set of computers, each configured to store a local representation of corresponding objects. When a computer changes the object set (e.g., by adding or altering an object), the updated object may be synchronized across the computers by iteratively forming and using an ad hoc swarm network from the neighbors of a node storing the updated object. This swarm network may operate cooperatively, where each node distributes object chunks to other nodes as quickly as possible, and may disregard concepts of competitive swarm networks such as fairness and cheating avoidance, which may not apply to cooperative swarming and might otherwise slow the propagation of the object. An alternative "ask" technique may be included to identify and recover missed object updates, and a computing environment host may be included as an authoritative object source and/or as an object store of last resort.

20 Claims, 8 Drawing Sheets

(56) References Cited

OTHER PUBLICATIONS

"Introduction to Windows Peer-to-Peer Networking", Sep. 27, 2006, p. 1-17, http://technet.microsoft.com/en-us/library/bb457079(printer) aspx.

"Microsoft Updates Cloud Sync Beta", Apr. 9, 2009, p. 1-4 http://www.windowsfordevices.com/news/NS7042839224 html.

Notice of Allowance cited in related Chinese application 201080023715.9 Dated: Jun. 4, 2013 pp. 3.

Search Report cited in related Chinese Application No. 201080023715.9 Dated: Oct. 26, 2012 pp. 1-2.

First Office Action cited in related Chinese Application No. 201080023715.9 (PCT/US2010/036323) Dated: Nov. 5, 2012 pp. 1-9.

Response to First Office Action cited in related Chinese Application No. 201080023715.9 (PCT/US2010/036323) Dated: Jan. 8, 2013 pp. 1-4.

* cited by examiner

SWARM-BASED SYNCHRONIZATION OVER A NETWORK OF OBJECT STORES

BACKGROUND

In the field of computing, many scenarios involve a set of computers or devices configured to store data, sometimes represented as a set of objects, where the computers are connected over a network. In some scenarios, a set of computers or devices may respectively store a local representation of a particular object. It may be desirable to propagate changes to one local representation of the object to the other local representations of the corresponding object stored on the other computers or devices by communicating over the network. In more complex scenarios, the set of shared objects may be large, and changes may be frequent. However, the available network bandwidth of a particular computer or device may be limited, and may serve to limit the rate at which a computer or device may receive data about changed objects and send data about changes to local representations to other computers or devices. Therefore, it may be difficult to establish a reliable mechanism whereby the computers and devices may communicate notifications of changes to such objects and allocate the limited bandwidth of the network to achieve an efficient propagation of changes to such data objects.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One mechanism for synchronizing objects involves an arrangement among the nodes of the network that, when a node detects a change to a local representation of an object, such as a writing of a new object or an alteration of an existing object (any such change is referred to herein as an "updated object"), it notifies a subset of fully interconnected nodes ("neighbors") of the updated object, and identifies the neighbors that do not have the updated object. It may then arrange to have the object sent to these neighbors in an efficient manner, such as via a peer-to-peer network. In particular, the small set of neighbors may form a "swarm" type of peer-to-peer network, wherein each neighbor may, while receiving portions of the object from the source (i.e., the node that initiated the peer-to-peer network and that has the full updated object), forward received portions of the object to other neighbors, and may concurrently receive other portions of the object from other neighbors. This technique therefore utilizes both the uploading and downloading bandwidth of the nodes comprising the swarm network to achieve a faster distribution of the object than a centralized transfer of the object from the source to each neighbor. Moreover, in contrast with other swarm networks that are configured to promote competitive fairness (e.g., aspects of BitTorrent that promote a "fair" distribution of uploading capacity among the nodes that have significant portions of the data to be exchanged), the swarm network connecting these devices may be configured to utilize more bandwidth from nodes with more uploading capacity in order to achieve a faster distribution of the updated object. Additional features may optionally be incorporated in order to promote economy and robustness in various scenarios (e.g., an "Ask" technique may be included to allow a newly connected or reconnected computer or device to receive changes that were distributed while the computer or device was offline, and communication with a computing environment host may be included to synchronize objects with a centralized and authoritative source for the object set.)

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
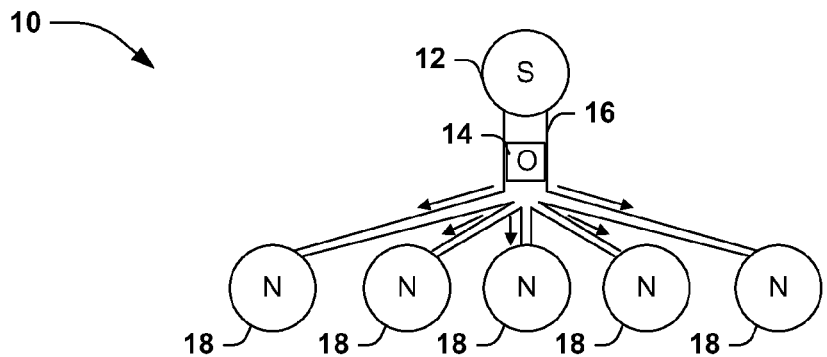
FIG. 1 is an illustration of a source node sending an object to a set of nodes over a network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of computing, many scenarios involve a set of computers (e.g., servers, workstations, notebooks, mobile phones, and other devices) that store various sets of data, and that can communicate over a network. In some of these scenarios, two or more computers may respectively store a representation of a particular set of data, such as one or more objects (e.g., files, database records, tuples, class instances, etc.) For example, an object may be replicated across several computers in order to provide local access to the object, e.g., for local use, for faster access, and/or for maintaining access to the object in the event of a network partitioning or disconnect. Additionally, the computers may endeavor to synchronize the various representations of the object, such that changes to a local representation of the object on one computer may be propagated to the other representations on other computers.

More generally, respective computers may be connected over one or more networks (e.g., computers A, B, and C may be mutually accessible over a first network, while computer A may connect with computers D and E over a second network), and respective computers may comprise an object store configured to store a set of objects, where particular objects in a first object store of a first computer correspond to particular objects in a second object store of a second computer. Among these computers, changes to an object are to be synchronized with a corresponding object stored in the respective object stores of the other computers. The computers may cooperate to achieve this synchronization over the network. However, respective computers often have a limited upload and/or download capacity, and in some cases (e.g., mobile devices), limited processing power and/or battery life. These limitations might restrict the rate of propagation of changes, and may place an inordinate and potentially inefficient burden on some computers in achieving the synchronization.

FIGS. 1-4 illustrate four examples of network inefficiencies that might be exhibited by improperly designed synchronization strategies. In each of these scenarios, a source node 12 stores an object 14 that is to be transmitted to one or more nodes over one or more networks. The object 14 to be synchronized may comprise, e.g., a new object that is not yet in the object stores of the nodes, or an object that has been updated at the source 12 with changes that are to be propagated to the nodes, or an object that the source 12 received (newly or in updated form) from another node over the same or another network.

In the first example 10 of FIG. 1, the source 12 endeavors to send the object 14 to a set of nodes 18 over a network 16, where the source 12 has a relatively large upload capacity. However, the source 12 in this first example 10 sends the object 14 in full to each of the nodes 18, thereby magnifying the upload bandwidth involved in sending the object 14 by a factor of five. Even if the network connection 16 of the source 12 features a comparatively large upload capacity, the upload capacity may be quickly exhausted as the number of nodes 18 scales, leading to slow or failed delivery of the object 14 to the nodes 18.

Figure 2:
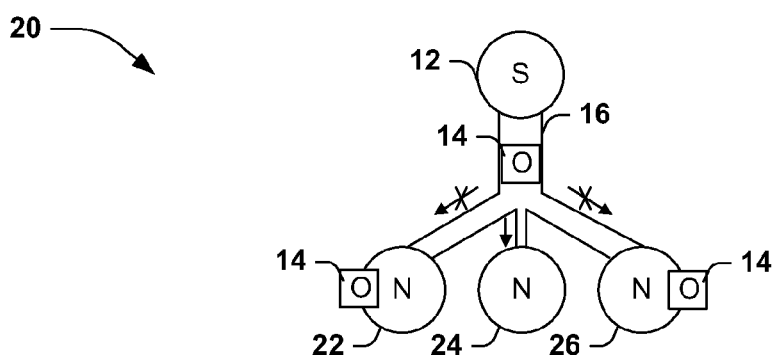
FIG. 2 is another illustration of a source node sending an object to a set of nodes over a network.

In the second example 20 of FIG. 2, the source 12 endeavors to send the object 14 over the network connection 16 to a small set of nodes, comprising a first node 22, a second node 24, and a third node 26. However, the first node 22 and the third node 26 may have already receive the object 14 (e.g., the source 12 may have received the object 14 from an upstream node that has already achieved the sending of the object 14 to the first node 22 and the third node 26 without informing the source 12.) The sending of the object 14 to the first node 22 and the third node 26 may therefore be redundant and an unproductive use of the upload capacity of the source 12.

Figure 3:
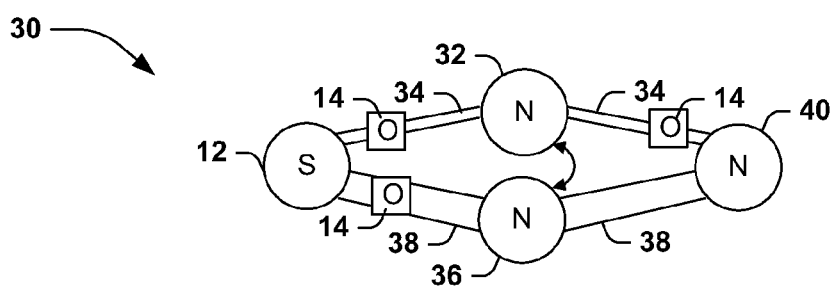
FIG. 3 is another illustration of a source node sending an object to a set of nodes over a network.

In the third example 30 of FIG. 3, a source node 12 may coordinate to send the object 14 to a first node 32 over a first network 34 and a second node 36 over a second network 38. Both the first node 32 and the second node 36 may also be connected to a third node 40, to which the object 14 is also to be sent. The source 12 may achieve the delivery of the object 14 to the first node 32 and the second node 36 respectively over the first network 34 and the second network 38, and these nodes may endeavor to send the object 14 to the third node 40. As one example of an inefficiency, both nodes may send the object 14 to the third node 40, thereby resulting in a redundant delivery and an unproductive use of bandwidth. As another example of an inefficiency, the first node 32 and the second node 36 might communicate to avoid the redundancy, such that whichever node receives the object 14 first may deliver the object 14 to the third node 40 at the exclusion of the other node. While this coordination may avoid redundancy, the decision of which node is to send the object to the third node 40 may be based on an arbitrary race condition, rather than an evaluation of capacities. For example, if the first node 32 happens to receive the object 14 before the second node 36, the first node 32 may opt to send the object 14 to the third node 40, even if the upload capacity of the first node 32 over the first network 34 is much smaller than the upload capacity of the second node 36 over the second network 38. An avoidable delay may therefore be incurred in sending the object 14 to the third node 40. In addition, the more limited upload capacity of the first node 32 may be unduly consumed rather than the more plentiful upload capacity of the second node 36, which e.g., might significantly delay delivery of the object 14 to an additional node that might be reachable by the first node 32 over the first network 34 but not the second node 36 over the second network 38.

Figure 4:
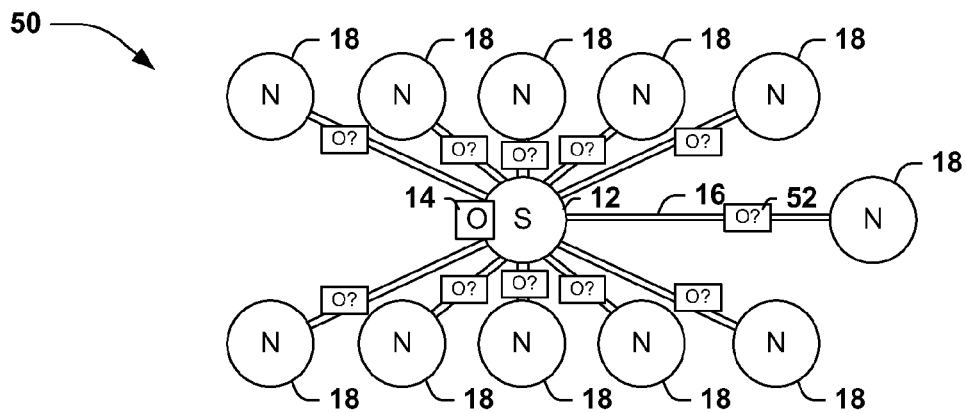
FIG. 4 is another illustration of a source node sending an object to a set of nodes over a network.

In the fourth example 50 of FIG. 4, the source 12 stores the object 14 to be delivered to the nodes 18 of a large network. Even if the delivery of the object 14 may be coordinated among the nodes 18 in a more efficient manner than in the examples of FIGS. 1-3, the nodes 18 might nevertheless request information about the object 14 from the source 12. (Alternatively, the source 12 may be responsible for notifying each node 18 of the updated object 14.) Even disregarding the costs of sending the object 14, the network and processing costs of handling queries about the object 14 and providing information about the object 14 might overwhelm the source 12 and significantly delay the propagation of the object 14 to the nodes 18.

The examples of FIGS. 1-4 illustrate network inefficiencies of various types, but many of these deficiencies arise from an excessive dependency on the upload capacity of a source 12 and the download capacity of the nodes 18. These bottlenecks may become exacerbated as the network scales, leading to further delays and potentially a breakdown in the capability of delivering the object 14 to all of the nodes 18. In view of these network difficulties, alternative synchronization strategies have been devised to promote a more efficient delivery of an object across a set of computers connected by at least one network. Better scaling may be achieved by also utilizing the upload capacities of the nodes 18 (e.g., to redistribute the object 14, or portions thereof, to other nodes 18) and/or the download capacity of the source (e.g., for tracking the reception status of the object 14 among the nodes 18.) Additionally, the allocation of network bandwidth may be delegated to the respective nodes 18, thereby distributing the computing power across the nodes 18 of the network and correlating such allocations with locally detected network capacities. These strategies, following a "swarm network" technique, thereby extend the use of network resources to achieve a faster distribution of the object 14, and the delegation of allocation may yield significant improvements as the number of nodes 18 and the number of objects 14 exchanged thereamong scales.

Figure 5:
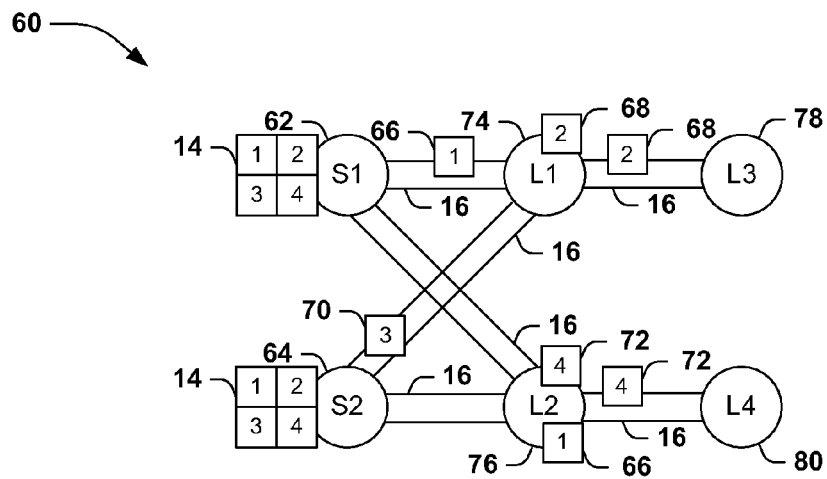
FIG. 5 is another illustration of a source node sending an object to a set of nodes over a network.

FIG. 5 presents a simplified example 60 of one such swarm network known as BitTorrent. In a typical BitTorrent network, an object 14 is to be sent by one or more "seed" nodes, each of which stores an identical copy of the object 14, to a set of "leech" nodes, each of which stores less than a full copy of the object 14. In order to deliver the object 14 to the leech nodes, the seed nodes divide the object 14 into chunks, which may be selected, e.g., based on size, utility (such as a set of discrete sub-objects comprising the object 14), an arbitrary "chunking" algorithm, etc. Moreover, the nodes of the BitTorrent network are fully interconnected, such that any node may contact any other node over the network 16. The interconnected nodes of the BitTorrent swarm network may therefore cooperate to exchange chunks of the object 14 by storing chunks received from some nodes, and by redistributing chunks to other nodes. Upon joining the BitTorrent swarm, a leech node may receive a list of the chunks comprising the object 14, a list of the seed nodes that store all chunks of the object 14, and a list of leech nodes and the chunks of the object 14 that are stored by each node. A leech node may therefore request chunks of the object 14 from the various seed and leech nodes, and may redistribute received chunks to other leech nodes. When a leech node receives all of the chunks comprising an object, it may remain in the BitTorrent swarm network as a seed node.

In the simplified example 60 of a BitTorrent swarm network presented in FIG. 5, an object 14 is to be distributed from a first seed 62 and a second seed 64 (each storing a complete and identical copy of the object 14) to a set of leeches comprising a first leech 74, a second leech 76, a third leech 78, and a fourth leech 80. The object 14 comprises a first chunk 66, a second chunk 68, a third chunk 70, and a fourth chunk 72, each of which is stored by the first seed 62 and the second seed 64, and which are unevenly and incompletely distributed among the leech nodes (e.g., the first leech 74 stores the second chunk 68, and the second leech 76 stores the first chunk 66 and the fourth chunk 72.) In order to promote the rapid dissemination of the chunks of the object 14, the first seed 62 is sending the first chunk 66 to the first leech 74, and the second seed 64 is sending the third chunk 70 to the first leech 74. While the first seed 62 might be capable of sending the second seed 68 or the third seed 70 to the second leech 76, it may instead rely on another node (such as the first leech 74) to distribute these chunks to the second leech 76. Similarly, the second seed 16 may forego sending the second chunk 68 to the second leech 76, because it may obtain this second chunk 68 from the first leech 74. Concurrently, the first leech 74 and the second leech 76 may send some initial chunks to the third leech 78 and the fourth leech 80, each of which initially stores no chunks (e.g., having just joined the BitTorrent network.) In this manner, the first seed 62 and the second seed 64 cooperate with the leech nodes to distribute the chunks of the object 14 by sharing the distribution costs with the leech nodes.

BitTorrent networks are adept at synchronizing an object in a peer-to-peer manner among a set of nodes that are comparatively untrusted, and by allocating the distribution in a "fair" manner. As a first example, an operator of a node 18 typically chooses to join one a BitTorrent swarm network in order to obtain the particular object exchanged thereby, and may choose to leave the BitTorrent swarm network at any time (even before having fully received the object 14.) It may also be presumed that each operator of a node operates independently, "selfishly," i.e., participating in the network (and contributing the upload and download capacity of the node to the swarm network) only to the extent that participation benefits the operator. For example, an operator of a node benefits from receiving (downloading) the object but does not directly benefit from sending (uploading) the object to other nodes, especially if such upload capacity is limited and diverted from other uses. An operator of a node may attempt to "cheat" in the cooperative synchronizing by fully utilizing the download capacity of the node to achieve rapid receipt of the object, but limiting or eliminating the upload capacity of the node to preserve upload capacity for more desirable tasks. The BitTorrent swarm network is configured to reduce "cheating" by allocating the delivery of chunks of the object 14 to a leech at a rate proportional to the rate of redistribution of chunks by the leech 14. Thus, a leech node that throttles the upload capacity (or simply has little upload capacity to contribute to the swarm network) is provided new chunks of the object 14 at a low rate. Conversely, BitTorrent swarm networks are configured to promote "fairness" among the distribution of chunks to nodes by recognizing leech nodes that are proficient at redistributing chunks, and by rewarding such redistribution by providing a new chunks of the object 14 at a high rate, potentially prioritizing such delivery (such as by the seeds) over the delivery of chunks to less well-performing nodes. Additionally, because many objects typically exchanged over BitTorrent networks may be useless to the node operators until all chunks have been received, the network may prioritize the delivery of chunks to a leech that has received nearly all chunks over the delivery of chunks to leeches that are storing fewer chunks. Conversely, the nodes may significantly restrict the rate of delivery of chunks to recently joined leeches that are storing few or no chunks (especially since the operators of such leeches are more likely to disconnect from the swarm network than the operators of leeches that are closer to completion of the object.)

As a second example, BitTorrent swarm networks are designed to detect, report, and mitigate malicious or defective nodes that distribute changed or damaged versions of the object. In many implementations, the chunks comprising an object are fixed at the formation of the swarm network, and an authoritative list of chunks is provided to all nodes by one or more designated seed nodes (identified as "tracker" nodes) that indicates a hashcode for respective chunks. Upon receiving a chunk from a node, the receiving node verifies the contents of the chunk according to the hashcode of the chunk; if the chunk has been changed or damaged (such as by the distributing node), the receiving node may report the sending node to the tracker nodes as potentially defective or malicious, and the tracker nodes may evict such nodes from the swarm network.

Figure 6:
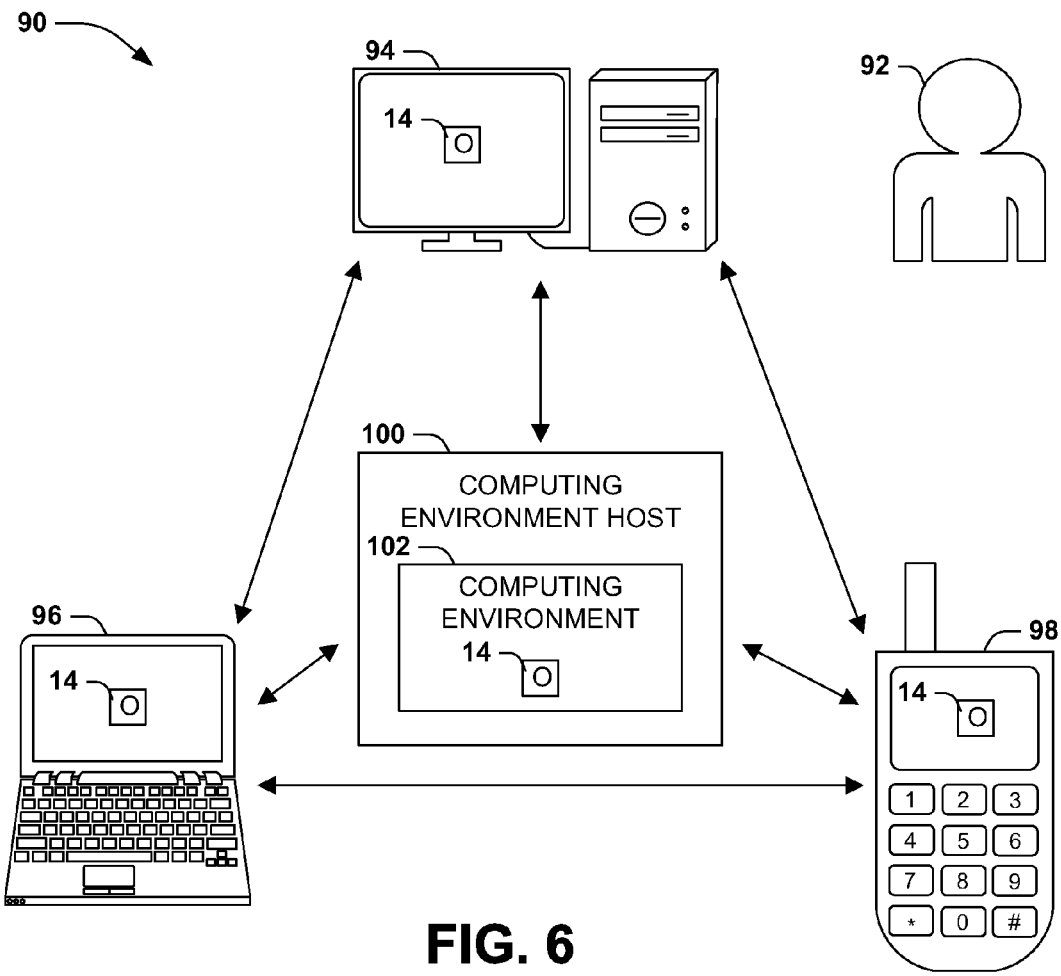
FIG. 6 is an illustration of a set of computers configured to synchronize local representations of an object stored thereamong and by a computing environment host.

These specializations of the BitTorrent swarm network may promote the distribution of a static object among untrusted swarm nodes by reducing cheating, by promoting fairness, and by detecting and evicting malicious or defective nodes. However, in other scenarios, these aspects of swarm networks such as the BitTorrent swarm network may be unhelpful or unnecessary, and may reduce the efficient distribution of the object. FIG. 6 presents an exemplary illustration 90 of one such scenario, wherein the nodes of the swarm network comprise a set of computers operated by a user 92. The computers may comprise, e.g., a workstation 94, a notebook computer 96, and a cellphone device 98. The user 92 may wish to store a local representation of an object 14 on each of these computers, and, when the computers may communicate over a network, to synchronize the object 14 among all such computers. Moreover, the user 92 may utilize a computing environment host 100 that stores an authoritative version of the computing environment 102 of the user 92, comprising the complete set of objects used by the user 92, such as files, applications, application configuration information, user profiles, security credentials (such as usernames and passwords, certificates, and public and private cryptographic keys), which may be deployed (in whole or in part) by the computing environment host 100 to each computer. The computing environment host 100 may also include in the computing environment 102 a local (and potentially authoritative) representation of the object 14, and may participate in the synchronization of the object 14.

The exemplary scenario 90 differs from the scenario for which the BitTorrent swarm network is customized in several aspects. As a first example, the user 92 may change the object 14 using any of the computers or the computing environment host 100, and such changes are to be propagated among all computers and the computing environment host 100. This aspect differs from many swarm networks (including BitTorrent) that presume a static object 14, and that regard changes to the object 14 by a particular node as evidence of a malicious or defective alteration of the object 14. As a second example, whereas each node in a BitTorrent swarm network specifically opts to participate in the swarm network, the computers in the exemplary scenario 90 of FIG. 6 may be "pulled" into a newly formed swarm network in order to receive an update of the object 14 (especially if the update is spontaneous or unexpected.) As a third example, whereas BitTorrent networks seek to establish "fairness" of network capacity consumption and to reduce cheating by node operators, the user 92 in FIG. 6 fully trusts the nodes of the swarm network, and may prefer rapid and complete deployment of the object 14 over the tracking and adjusting for "fairness" and avoiding cheating. For instance, whereas the BitTorrent network seeks to adjust the delivery of chunks to a node proportionally with the rate of chunks redelivered by the node, the user 92 of this network may prefer to achieve a high rate of delivery of the object 14 to all nodes, e.g., by as fully as achievable utilizing the upload capacities of the nodes. As a fourth example, whereas each node in a BitTorrent swarm network may operate on a comparatively selfish and individualized basis to achieve the goals of the node operator, the nodes of the swarm network illustrated in FIG. 6 may operate holistically; e.g., a node with high upload capacity may opt to allocate much or all of the upload capacity for the distribution of the object 14, even if the rate of receiving chunks of the object is slow or nonexistent, in order to promote the distribution of the object 14 among all of the nodes.

In view of these distinguishing features of a cooperative network, techniques may be devised to synchronize an object set across a set of computers respectively configured to store a local representation of the object set in an efficient manner. In this cooperative network, any node might generate a change to the object, and the changes are to be propagated quickly and reliably throughout the network, without necessarily accounting for competitive aspects such as reducing cheating, promoting "fairness," balancing, and detecting malicious or defective nodes. Such swarm networks may utilize a "tell" architecture, whereby each node notifies other nodes upon identifying an updated object in its object set, and a "push" architecture, whereby the node initiates the sending of the updated object to nodes that are not storing the updated object. Thus, the node 18 controlling the interaction acts as a server that delivers updated objects 14 (or chunks thereof) to nodes 18 acting as clients configured to receive the updated objects 14. Moreover, even if the nodes of the network are fully interconnected and can communicate at equivalent rates, the network propagation of an updated object may occur in small groups of nodes ("neighbor" nodes) in order to reduce scaling difficulties (such as in the fourth example 50 of FIG. 4.)

Figure 7:
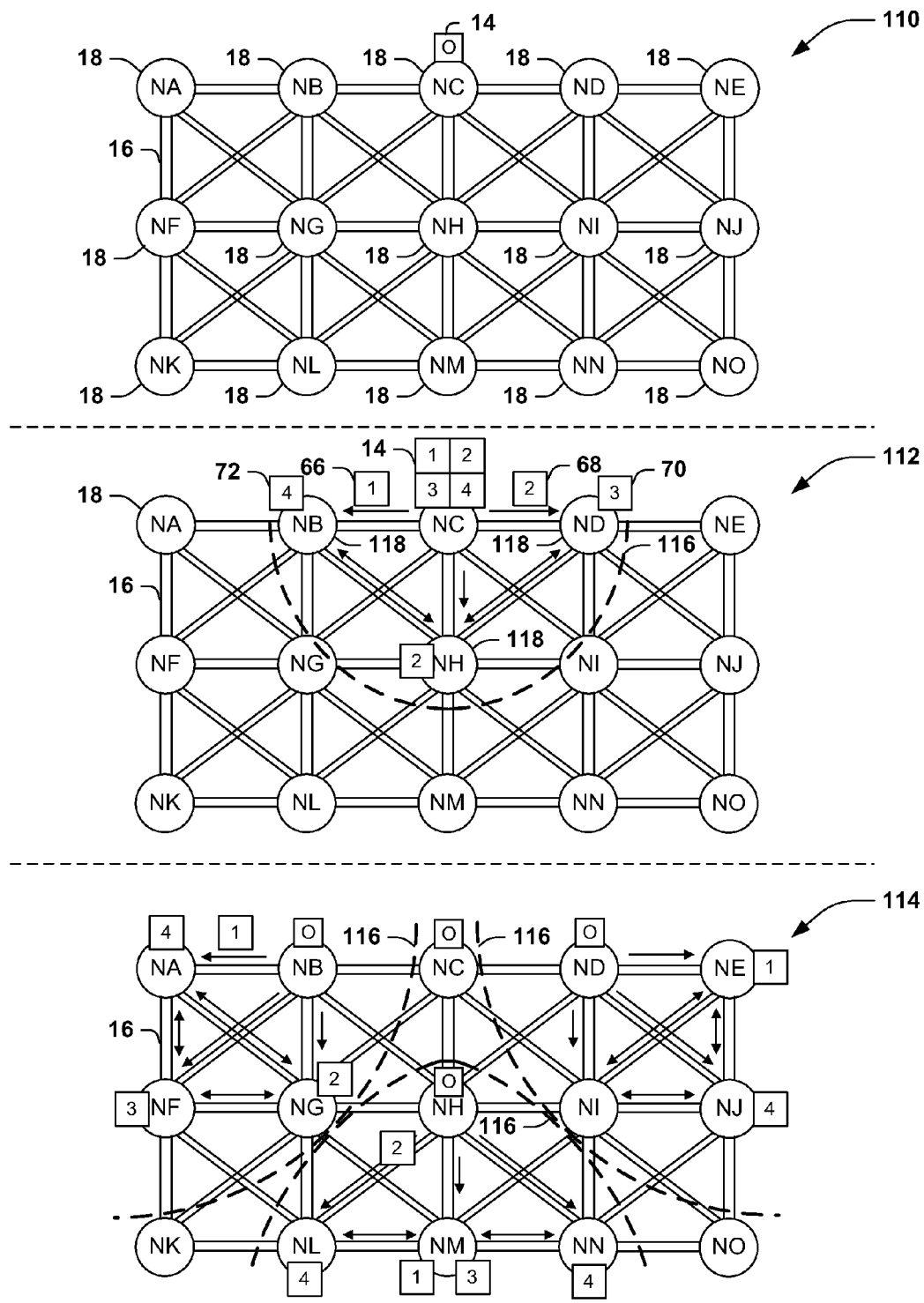
FIG. 7 is an illustration of a set of nodes synchronizing an object over a network.

FIG. 7 presents an exemplary scenario (illustrated at a first time point 110, a second time point 112, and a third time point 114) involving a synchronization of an object 14 across a set of nodes 18 (identified by letter, e.g., NA=node A and NB=node B) connected via a network 16 (such as a set of computers respectively configured to store a local representation of the object 14, and to synchronize changes to the object 14 with the other computers.) The object 14 may comprise, e.g., a new object created by a node, or an object that exists across the nodes but is updated at a node, or an object received by a node from another source. It may be appreciated that the nodes 18 are fully interconnected and that any two nodes 18 are mutually accessible over the network 16, although the interconnections are not fully illustrated in FIG. 7.

At the first time point 110 of the exemplary scenario of FIG. 7, node C receives the object 14 and endeavors to synchronize the object 14 with the other nodes 18. Attempting to synchronize the object 14 with all of the nodes 18, or even attempting to notify all of the nodes 18 of the update to the object 14, may lead to significant network congestion that restricts the rate of synchronization, such as illustrated in FIG. 4. Rather, node C first selects a subset of nodes 18 as "neighbors" that are mutually accessible (i.e., where each node is accessible to all of the selected neighbors.) For example, node C may select nodes B, D and H as neighbors. Having selected a set of neighbors, node C then determines which neighbors are not storing the updated object 14. (For example, node C may notify each neighbor of the update and may offer to send the updated object 14 to the neighbor, and the neighbor may respond affirmatively or negatively.) If a neighbor is storing the updated object 14, no further synchronization is involved between node C and the neighbor. However, at the first time point 110 of FIG. 7, selected neighbors B, D, and H do not store the updated object 14, and so indicate to node C.

As further illustrated in FIG. 7, after determining which nodes 18 are not storing the updated object 14, Node C forms a swarm network 116, designating as swarm nodes 118 in the swarm network 116 each mutually accessible neighbor that is not storing the updated object 14. (Node C may also participate as a swarm node 118, but as node C is the originator of the swarm node 118, it does not have to receive any chunks, and may be regarded as the source of the updated object 14 within the swarm network 116.) The node C 18 notifies the swarm nodes 118 of the formation of the swarm network 116, and begins sending the updated object 14 to the swarm nodes 118 of the swarm network 116. For example, and as illustrated at the second time point 112, node C may segment or "chunk" the object 14 into a set of chunks, or data units of the object 14 that may be individually delivered. The object 14 of FIG. 7 is "chunked" into four chunks, and node C commences with delivering various chunks of the object 14 to the swarm nodes 118. Concurrently, each swarm node 118 (nodes B, D, and H) may receive the chunks and store them in the object store of the swarm node 118, and may redeliver the chunks to the other swarm nodes 118. For example, at the second time point 112, node H is storing the second chunk 68 and may identify that node B does not have the second chunk 68, and may therefore redistribute the second chunk 68 to node B. This swarming delivery of chunks may continue until all of the swarm nodes 118 have all of the chunks of the object 14, at which point the swarm network 116 may be terminated.

However, when the swarm network 116 is terminated, each of the swarm nodes 118 of the former swarm network 116 may now identify the updated object 14 stored in the respective object stores. Consequently, each of nodes B, D, and H may select a new set of neighbors, and may determine whether each neighbor is storing the updated object 14. For example, node B may select nodes A, F, and G as neighbors, may determine that none of these nodes are storing the updated object 14, and may form a swarm network 116 by designating these nodes 18 as swarm nodes 118 for the synchronization of the updated object 14. Node B may then notify each of the swarm nodes 118 of the swarm network 116 and may commence sending chunks to the swarm nodes 118 for redistribution thereamong. Similarly, node H may select nodes L, M, and N as neighbors and may, after determining that these nodes 18 are not storing the updated object 14 and may form a swarm network 116 designating these nodes 18 as swarm nodes 118; and node D may select nodes E, I, and J as neighbors, determine that these nodes also do not store the updated object 14, and may form a swarm network 116 of these nodes. At the third time point 114, these three swarm networks 116 operate to distribute the updated object 14 more broadly across the nodes 18, and further propagation by ad hoc swarm networks (e.g., to nodes K and O) may complete the synchronization of the object 14 among all nodes 18.

A few additional aspects of this technique may be illustrated and/or appreciated based on the exemplary scenario of FIG. 7. As a first example, a node 18 may discover that a neighbor is already storing the updated object 14. This may occur, e.g., if the neighbor is already receiving or has already received the updated object 14 through another swarm network. In this event, the node 18 may simply exclude the neighbor from the swarm network. Alternatively, it may be advantageous to include the neighbor in the swarm network as an additional "seed," especially if the neighbor has spare upload capacity. As a second example, a swarm node 118 may be configured to contribute much or all of its upload capacity to the swarm network 116 in order to distribute chunks as quickly as possible, regardless of the rate at which the swarm node 118 is receiving chunks of the updated object 14. While this allocation may not be "fair" to the swarm node 118, the swarm networks 116 are formed to promote a rapid synchronization of the updated object 14 to the nodes, and not to promote "fairness" or reduce cheating, as may concern the operators of the independent nodes of the BitTorrent swarm network. As a third example, node C may, upon completing the delivery of the updated object 14 to the swarm nodes 118 of the swarm network 116, end its participation in the exchange of data (e.g., to promote a load balancing of computing power or network utilization among the nodes 18 of the network 16.) This variation may be useful, e.g., because neighbor selection may be a computationally difficult and/or resource-intensive process, especially if the selection of neighbors is designed to cluster the nodes 18 of the network 16 in a comparatively uniform manner; each node 18 may therefore synchronize the updated object 14 among its neighbors as its contribution to the network-wide synchronization. Alternatively, if a node (such as node C) is permitted to select neighbors ad hoc for the synchronization of a particular object 14, then the node may, after completing its synchronization with a first neighbor set, endeavor to select a new set of neighbors that do not yet store the updated object 14, and may form a second swarm network 116 for the exchange thereamong.

Figure 8:
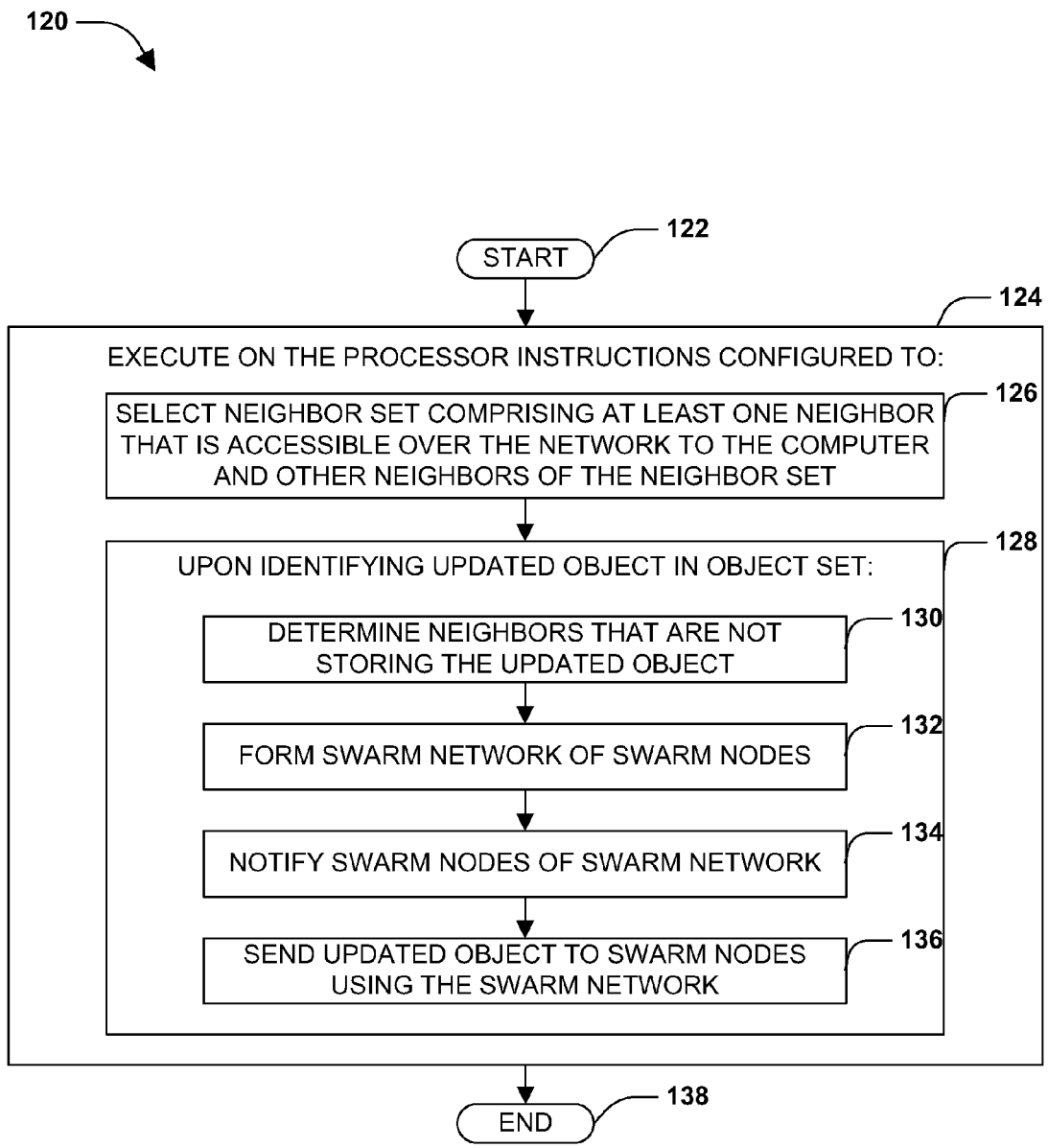
FIG. 8 is a flow chart illustrating an exemplary method of synchronizing an updated object of an object set stored by a computer with corresponding objects stored by at least one node accessible over a network.

FIG. 8 presents a first embodiment of the techniques discussed herein, comprising an exemplary method 120 of synchronizing objects 14 of an object set stored by a computer having a processor with corresponding objects of object sets stored by at least one node 18 accessible over at least one network 16. The exemplary method 120 begins at 122 and involves executing 124 on the processor instructions configured to perform the synchronizing. The instructions may be configured to select 126 from the nodes 18 a neighbor set comprising at least one neighbor that is accessible over the at least one network 16 to the computer and other neighbors of the neighbor set. The instructions may also be configured to, upon identifying 128 an updated object 14 in the object set, determine 130 the neighbors that are not storing the updated object 14; to form 132 a swarm network 116 of swarm nodes 118 comprising the neighbors not storing the updated object 14; notify 134 the swarm nodes 118 of the swarm network 116 formed for the updated object 14; and send 136 the updated object 14 to the swarm nodes 118 using the swarm network 116. Having achieved the delivery of the object 14 to the nodes 18 comprising the swarm network 116, the exemplary method 120 thereby achieves the synchronizing of the object, and so ends at 138.

Figure 9:
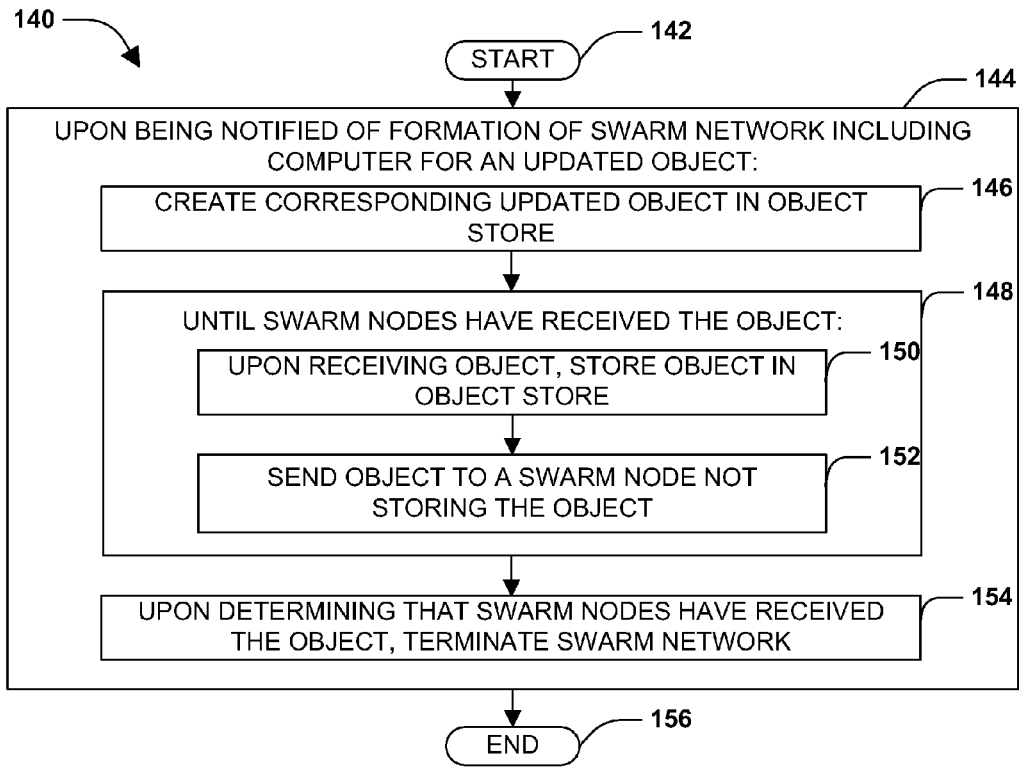
FIG. 9 is a flow chart illustrating another exemplary method of synchronizing an updated object of an object set stored by a computer with corresponding objects stored by at least one node accessible over a network.

While the exemplary method 120 of FIG. 8 may achieve the delivery by the computer of an updated object 14 to a set of nodes, additional advantages may be achieved if the computer is also configured to receive an updated object 14 by participating in a swarm network 116 formed by another node 18 operating as the source of the updated object 14 (i.e., the computer may be configured not only as a server in this synchronization technique, but also as a client.) FIG. 9 illustrates an exemplary method 140 of receiving an updated object 14 in the course of a synchronization of objects 14 in the object store, which may be achieved, e.g., by additionally configuring the instructions executing on the processor. In this exemplary method 140, the instructions may be further configured, upon being notified 144 of a formation by a source of a swarm network 116 comprising the computer for an updated object 14, to begin at 142 and to create 146 a corresponding updated object 14 in the object store. The instructions may also be configured to, until the swarm nodes 118 have received the object 14, participate in the swarm network 116. This participation may involve, upon receiving the object 14, storing 150 the object 14 in the object store, and sending 152 the object 14 to a swarm node 118 not storing the object 14. Finally, the instructions may configured to, upon determining that the swarm nodes 118 have received the object 14, terminate the swarm network 116. Having achieved the receiving and redistribution of the object 14 using the swarm network 116, the exemplary method 140 may further promote the synchronization of the object 14 across the nodes 18, and so ends at 156.

Figure 10:
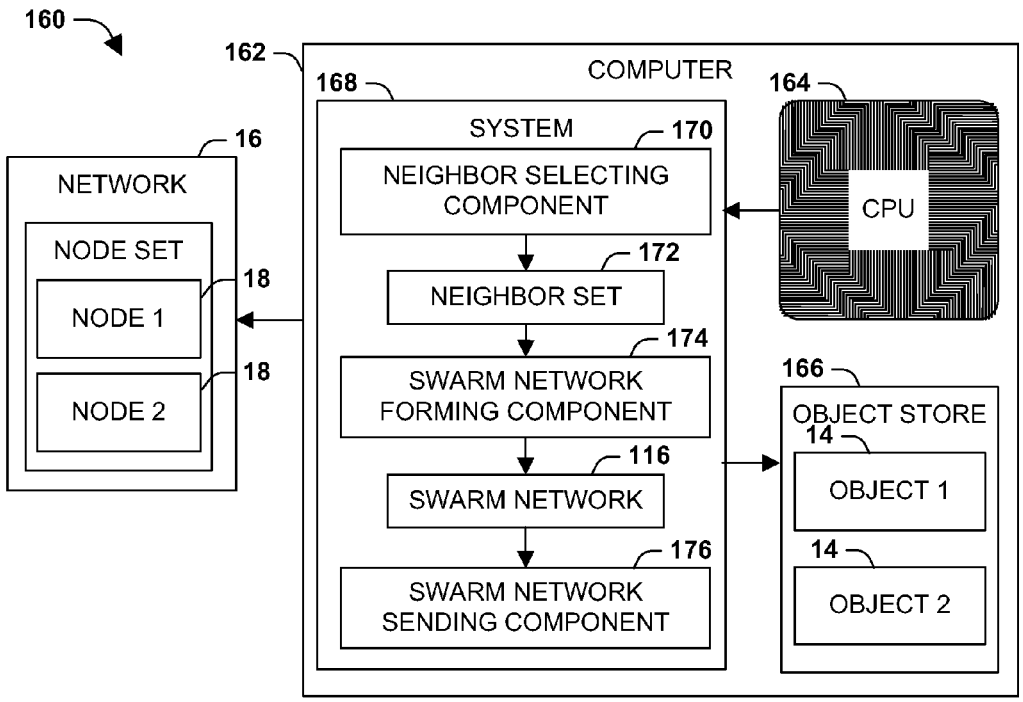
FIG. 10 is a component block diagram illustrating an exemplary system for synchronizing an updated object of an object set stored by a computer with corresponding objects stored by at least one node accessible over a network.

FIG. 10 illustrates another embodiment of the techniques discussed herein within an exemplary scenario 160 involving a computer 162 having a processor 164 and an object store 166 configured to store at least one object 14. The computer 162 may be connected to a network 16 and may be mutually accessible to a set of nodes 18 over the network 16, each of which may also comprise an object store 166 storing corresponding local representations of the objects 14. The exemplary computer 162 may therefore cooperate with the nodes 18 to synchronize updated objects 14 in the object store 166. This cooperation may be achieved by including in the computer 162 an exemplary system 168 configured to utilize the techniques discussed herein. For example, the exemplary system 168 may include a neighbor selecting component 170, which may be configured to select from the nodes 18 a neighbor set 172 comprising at least one neighbor that is accessible over the at least one network 16 to the computer 162 and to other neighbors of the neighbor set 172. The exemplary system may also include a swarm network forming component 174, which may be configured to determine the neighbors in the neighbor set 172 that are not storing the updated object 14; to form a swarm network 116 of swarm nodes 118, comprising the neighbors that are not storing the updated object 14; and to notify the swarm nodes 118 of the swarm network 116 formed for the updated object 14. Finally, the exemplary system 168 may include a swarm network sending component 176, which may be configured to send the updated object 14 to the swarm nodes 118 using the swarm network 116. Having achieved the formation of the swarm network 116 and the distribution of updated objects 14 in the object store 166 to the swarm nodes 118, the exemplary system 168 thereby promotes the synchronization of the objects 14 of the object set.

Figure 11:
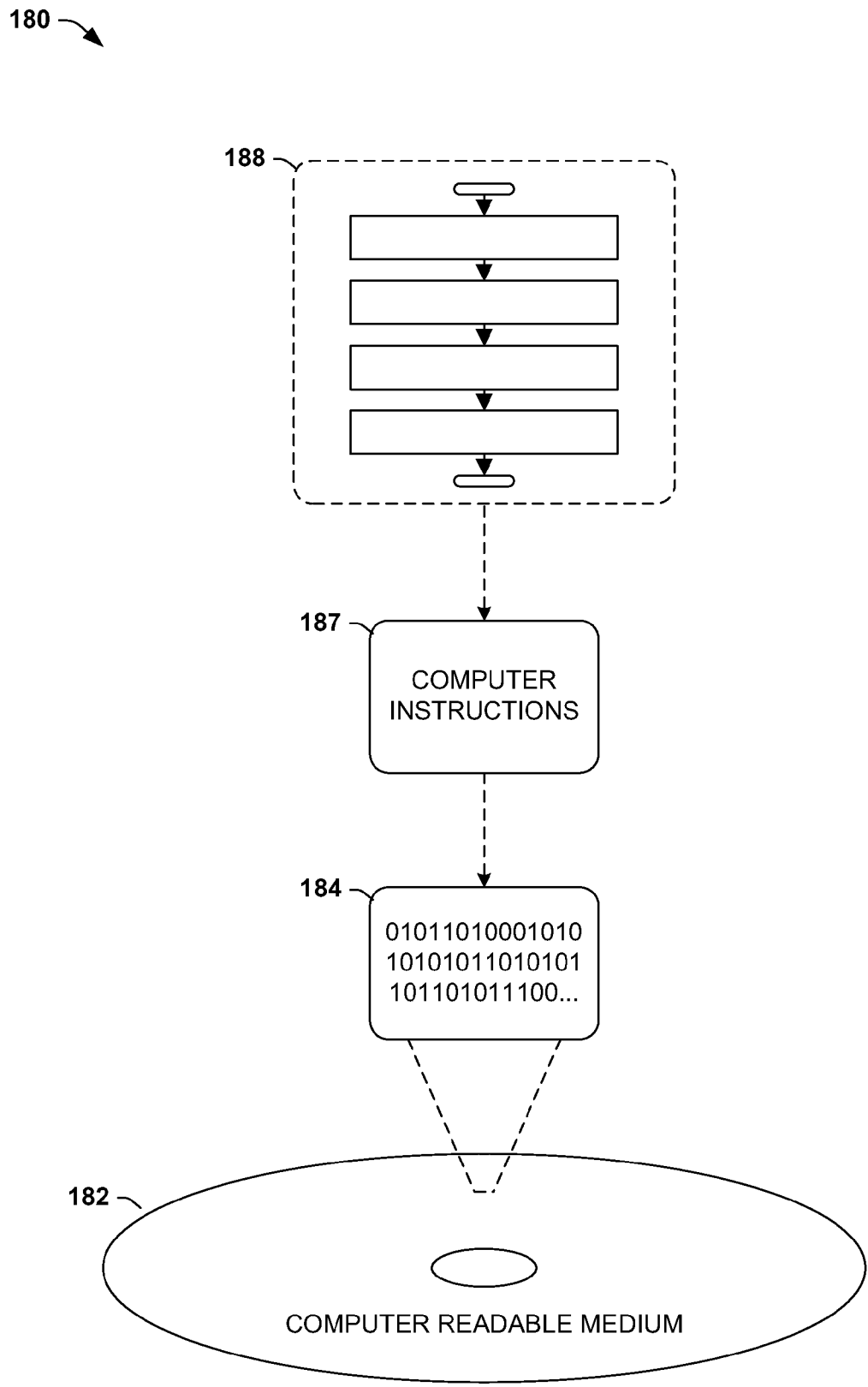
FIG. 11 is an illustration of an exemplary computer-readable medium comprising processor-executable instructions configured to embody one or more of the provisions set forth herein.

Still another embodiment of the techniques discussed herein involves a computer-readable storage medium comprising instructions that, when executed by at least one processor of a computer cause the at least one processor to synchronize objects 14 of an object set with corresponding objects 14 stored by nodes 18 that may be accessible to the computer over a network 16. An exemplary computer-readable medium that may be devised in these ways is illustrated in FIG. 11, wherein the implementation 180 comprises a computer-readable medium 182 (e.g., a CD-R, DVD-R, or a platter of a hard disk drive), on which is encoded computer-readable data 184. This computer-readable data 184 in turn comprises a set of computer instructions 186 configured to operate according to the principles set forth herein. In one such embodiment, the processor-executable instructions 186 may be configured to perform a method of synchronizing an updated object of an object set stored by a computer with corresponding objects stored by at least one node accessible over a network, such as the exemplary method 120 of FIG. 8. In another such embodiment, the processor-executable instructions 186 may be configured to implement a system for synchronizing an updated object of an object set stored by a computer with corresponding objects stored by at least one node accessible over a network, such as the exemplary system 168 of FIG. 10. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 120 of FIG. 8 and the exemplary system 168 of FIG. 10) to confer individual and/or synergistic advantages upon such embodiments.

A first aspect that may vary among embodiments of these techniques relates to the manner of sending updates of an object 14 to the nodes 18 by forming and using a swarm network 116. These variations may apply, e.g., while the computer functions as a server or source in the swarm network 116, such as according to the exemplary method 120 of FIG. 8.

A first variation of this first aspect relates to the identification of an updated object 14, which may trigger the synchronization of the object 14 with the other nodes 18. The synchronization may be triggered, e.g., by a creation of a new object 14 in the object store 166, or an updating of an object 14 in the object store 166. The synchronization might also be triggered by receiving a new object 14 or an updated version of the object 14 from another source, such as another device, another node 18 on the network 16, or a computing environment host 102. The synchronization might also be triggered, e.g., by a discovery of an updated object in the object store 166. For example, when the computer joins a network 16 and connects to the nodes 18, it may compare its object store 166 to the object stores of the other nodes 18 to discover changes that may have occurred while the computer was offline; and upon discovering such an updated object 14, the computer may synchronize the updated object 14 with the other nodes 18. In one such embodiment, the set of other nodes 18 consulted to discover changes may be limited, e.g., to a previously selected set of neighbors, in order to avoid a broadcast querying of many nodes 18 that might saturate the network 16. Constraining the nodes 18 contacted to discover updated objects 14 might therefore promote the scalability of the techniques discussed herein.

A second variation of this first aspect relates to the selection by a node 18 of the set of neighbors to be considered as swarm nodes 118 for an updated object 14. The selection of a neighbor set may help to avoid the problem illustrated in FIG. 4, where the source node 12 attempts to synchronize the updated object 14 with an overly large set of interconnected nodes 18, leading to network congestion and inefficient synchronization. The selection of neighbors may be arbitrary, but arbitrary selection might result in a less than fully interconnected network 16, where a first node 18 and a second node 18 are unable to communicate. The selection of neighbors might therefore be configured to mitigate a selection of neighbors that might lead to a partitioning of the network 16. The selection of neighbors might also be based on a variety of other factors, such as (e.g.) physical proximity, network topology (e.g., a subset of nodes on the same local area network or within a range of IP addresses), or comparatively low network latencies among the source node 12 and the neighbors. As a second example of this variation, the source node 12 may form a neighbor set comprising any number of neighbors, and in any manner. For example, the source node 12 may begin with an empty neighbor set, may iteratively test nodes 18 for mutual accessibility of the node with the selected neighbors, and may add any such node 18 to the neighbor set. The source node 12 may also designate any particular size of the neighbor set (e.g., neighbors may be added to the neighbor set until the neighbor set reaches an advantageous size, such as $\log_2(N)$ neighbors where N enumerates the nodes accessible over the network 16.) As a third example of this variation, the source node 12 may select neighbors upon beginning a synchronization of an updated object 18, e.g., upon identifying the updated object 18. This may be desirable, e.g., for permitting the source node 12 to promote the propagation of an updated object 18 after terminating a first swarm network 116, whereupon the source node 12 may select a new set of neighbors and form a second swarm network 116 if any such neighbors are not storing the updated object 14. Alternatively, the selection of neighbors may occur when a node 18 detects at least one network change event (e.g., when the node 18 connects to the network 16, when a new node 18 comes online, when a selected neighbor goes offline, or when the node 18 detects a partitioning of the network 16.) This may be advantageous because the selection of neighbors might be computationally intensive or resource-intensive, particularly if neighbors are selected by testing latency or modeling the capabilities of the network 16.

In one such embodiment implemented according to this second variation of this first aspect, the nodes 18 of the network 16 may be modeled according to a hypercube topology. According to this topology, respective nodes 18 of the network 16 may be connected such that each node 18 selects as neighbors the other nodes 18 along each edge of the hypercube. A first advantage of a hypercube topology involves an easy selection of neighbors simply by identifying the position of a node 18 within the hypercube and selecting as neighbors the nodes 18 connected at various edges. For example, if the nodes 18 of a fully interconnected network 16 may be enumerated from 1 to N (representing the number of nodes 18 in the network 16), the neighbors (0 through i) of a particular node (enumerated as n) may be identified and selected according to the formula:

$$S_i = n \operatorname{xor} 2^i | 0 \leq i < \operatorname{ceiling}(\log_2(N)), n \operatorname{xor} 2^i < N.$$

Thus, a new node 18 may identify and select its neighbors simply by identifying its enumeration and by computing the enumerations of the nodes 18 to which it is connected by edges of the hypercube model.

A third variation of this first aspect relates to the manner of identifying whether a neighbor stores the updated object 14. As a first example, each node 18 may store a list of objects 14 stored by other nodes 18 (particularly neighbors.) When a node 18 identifies an updated object 14, it may first notify other nodes 18 (particularly neighbors), each of which may update its internal list of objects 14 stored by the node. Subsequently, when a node 18 is identifying neighbors to add to a swarm network 116, it may reference its list of objects 14 stored by its neighbors, which may permit the node 18 to exclude a neighbor that has already received the updated object 14 (e.g., from another source or via another swarm network.) As a second example, the node 18 storing the updated object 14 may determine whether each neighbor stores the updated object 14 by polling such neighbors. For example, for each neighbor, the node 18 may send to the neighbor an identifier of the updated object 14 (e.g., a name, distinctive location, GUID, or inode number of the object 14) and a content indicator of the updated object 14 (e.g., a hashcode, version number, or latest modification date of the object 14.) The node 18 may then receive from the neighbor a notification whether the neighbor is storing the updated object 14, which the neighbor might generate, e.g., by comparing the identifier and the content indicator with the objects 14 in its object store 166.

A fourth variation of this first aspect relates to the relationship between an altered object 14 and the data exchanged over the swarm network 116 to achieve an alteration of the object 14 in the other representations. As a first example, whenever an alteration of an object is detected, the swarm network 116 may exchange the full contents of the object 14. As a second example, the swarm network 116 might exchange only the portions of the object 14 that have changed between the earlier version and the current version of the object 14. This example may be particularly advantageous, e.g., where changes to an object are limited to particular chunks, such that the swarm network 116 may only exchange the altered chunks, which may be written over the previous versions of such chunks in the object stores 166 of the nodes 18. Alternatively, the object 14 may define an internal structure (e.g., an array of records comprising a database), and the nodes 18 may exchange only the portions of the structure that have changed (e.g., new, updated, or deleted records in the database.) As a third example, the swarm network 116 might exchange a differential patch that may be applied by each node 18 to update the object 14 to the updated version. For example, the differential patch might instruct each node 18 to insert a data block of the object 14 at a particular location and delete another data block. Differential patches and partial updates may be advantageous, e.g., where small updates are made to large objects, while redistributing an entire object may be advantageous where the object is small or where the changes are extensive.

One such set of variations relate to the "chunking" of the object 14 into a set of chunks, each chunk comprising a data unit of the object 14 that may be individually delivered from one swarm node 118 to another node 118. In this variation, a "chunking" algorithm may be applied to segment the object 14 into chunks. Many such chunking algorithms might be compatible with the techniques discussed herein. For example, a chunking algorithm might choose segments in many ways; e.g., the algorithm might generate fixed-size chunks, or identify an internal structure of the object 14 and segment the object 14 according to the internal structure, or generate chunks at arbitrary positions. One such chunking algorithm that might be suitable for these techniques is remote differential compression (RDC), wherein an object 14 may be scanned to identify local maxima within respective portions of the object 14, and chunks of the object 14 may be selected as falling between such local maxima. This chunking algorithm might be particularly suitable, e.g., for reducing the odds of a change in one position of the object 14 (e.g., an insertion of a byte) incorrectly signaling an alteration of all of the following chunks in the object 14. Moreover, remote differential compression permits multiple levels of chunks for large objects 14; e.g., an object 14 might be chunked into a series of chunks, and smaller chunks might be identified within each chunk, etc. If only a small portion of the object 14 changes (e.g., a single byte), it may be more efficient to examine the large chunks to identify the change, to examine the smaller chunks within a changed large chunk to further localize the change, and then to request only the small chunk containing the change from one or more neighbors. Alternatively, if the object 14 comprises a set of items (e.g., a set of small objects batched together for synchronization as one object), each item may be selected as a chunk. In a particular chunking variation, a distinctive pattern of data may be identified within the object (e.g., a specific set of bytes) and chunking the object 14 accordingly.

The chunking of objects might be advantageous for several reasons. As a first example, small changes (insertions, alterations, or deletions of data) within the object 14 might fall within only a few chunks, and a differential comparison of the chunks may indicate that only particular chunks are to be exchanged in order to update the object 14. A second example involves the potential for re-use of a chunk that has a total bit-for-bit identity with a missing chunk. If a first chunk in an object 14 is identical to a second chunk in the object 14 or in another object 14, then a node 18 that has the first chunk but not the second chunk might simply duplicate the first chunk to create the second chunk in the object store 166, therefore avoid transferring the second chunk or over the network 16.

Figure 12:
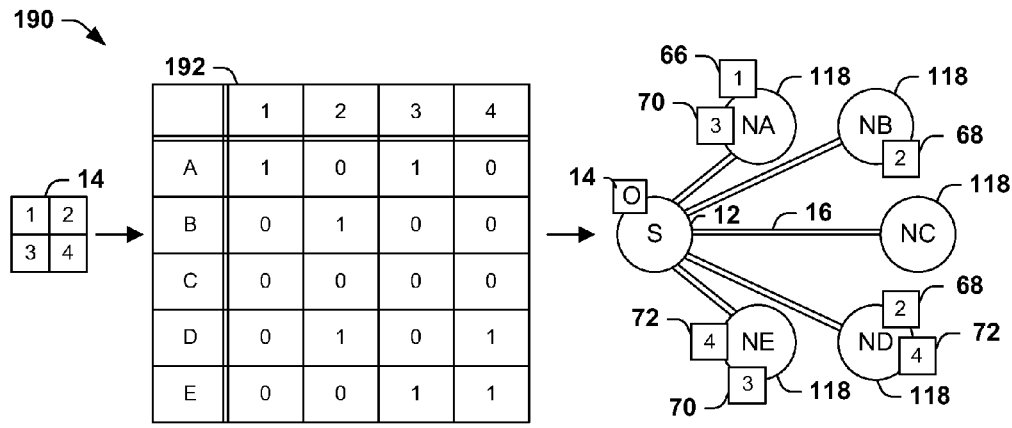
FIG. 12 is an illustration of a set of computers configured to synchronize local representations of an object using a swarm chunk map.

Additional advantages may be achieved by particular embodiments of these techniques based on these variations. FIG. 12 illustrates an exemplary scenario 190, featuring a source node 12 configured to send an object 14 over a network 12 to swarm nodes 118 comprising a swarm network 116. The source node 12 may chunk the updated object 14 into at least one chunk (four such chunks are formed in this exemplary scenario 190), and may then initialize an internally stored swarm chunk map 192, which indicates whether respective swarm nodes 118 are storing respective chunks of the updated object 14. The swarm chunk map 192 may comprise, e.g., a bitmap arranged as a two-dimensional array indicating 1 where a respective chunk is stored by a respective swarm node 118, and 0 otherwise. The source node 12 may select a chunk to send to a swarm node 118 by referring to the swarm chunk map 192. Moreover, when a swarm node 118 receives a chunk (either from the source node 12 or from another swarm node 118), the swarm node 118 may notify the source node 12 of storing the chunk, and the source node 12 may accordingly update the swarm chunk map 192. Finally, the source node 12 may determine that the swarm nodes 118 have received the object 14 by examining the swarm chunk map 192. It may be additionally advantageous for each swarm node 118 to store and initialize a swarm chunk map 192 to be referenced for sending chunks to other swarm nodes 118, and for each swarm node 118 to notify all other swarm nodes 118 upon storing a chunk.

The inclusion of a swarm chunk map 192 may also permit additional improvements in these techniques. For example, when a swarm node 118 (including the source node 12) selects a chunk to send to another swarm node 118, it may select a rare chunk stored in its object store, but that is infrequently stored among the swarm nodes 118 according to the swarm chunk map 192. This selection may facilitate an even distribution and broad availability of the chunks comprising the object 14 among the swarm nodes 118, thereby improving the accessibility of the chunks and the robustness of the swarm network 116 (e.g., to avoid the scenario where a node that goes offline may be the only source of a particular chunk.) For example, at the time point illustrated in the exemplary scenario 190 of FIG. 12, the source node 12 may be ready to send a chunk to another swarm node 118, and may examine the swarm chunk map 192 to identify a rare chunk. For example, the source node 12 may determine that the first chunk 66 is the least widely distributed chunk, and may therefore select the first chunk 66 to be sent to a swarm node 118 that is not storing the first chunk 66 (e.g., node B, C, D, or E.)

A fifth variation of this first aspect involves the selection of the updated object 14 to be synchronized with the swarm nodes 118. As a first example, the object store 166 may include a set of items that are more efficient to synchronize together with other nodes 18 than to synchronize individually. For example, the items may be semantically or logically related (e.g., a set of related records in a database or a set of resources that together comprise an application), or may be frequently updated together. The items might also comprise a set of items that individually comprise little data, or small updates that involve little data transfer. Alternatively, the items may comprise a set of items that have recently been updated; e.g., the computer may cache a set of items to be synchronized, and once a certain threshold (e.g., of elapsed time or amount of data to be updated) has been passed, to synchronize all of the items together. In such scenarios, it may be less efficient to generate a swarm network 116 (including selecting and notifying swarm nodes 118, chunking the object(s) 14, initializing swarm chunk maps 192, and initiating sending of chunks) for individual items than to bundle the items together in an object batch to be synchronized via a swarm network 116. Therefore, the computer may be configured to, upon identifying an updated object 14 in the object set, add the updated object 14 to an updated object batch comprising updated objects 14 not stored by the neighbors, and to form the swarm network 116 when the updated object batch exceeds an object batch threshold.

Alternatively or additionally, the computer may be configured to synchronize small updates (e.g., those involving a comparatively small amount of data to be synchronized, such as less than one megabyte; a small number of updated objects 14, such as fewer than ten; and/or a small neighbor set, such as fewer than three neighbors) without forming a swarm network 116, but simply by directly sending the data to be synchronized to the neighbors. Therefore, the computer may be configured to, upon identifying a small data update (e.g., a small number of updated objects 14; a small updated object 14; or a small neighbor set), send the small updated object set to the neighbors of the small neighbor set. This alternative configuration may permit a source node 12 to propagate a small data update more promptly, and without incurring unnecessary overhead of a swarm network.

A sixth variation of this first aspect relates to a prioritization of objects 14 to be synchronized by a source node 12. As a first example, it may be advantageous to synchronize higher-priority objects 14 before lower-priority objects 14, or on a stricter synchronization schedule (e.g., the synchronization of updates to lower-priority objects 14 may be deferred or batched, while the synchronization of higher-priority objects 14 may be promptly performed.) As a second example, the objects 14 may belong to different groups, and it may be desirable to synchronize the objects 14 belonging to a first group before objects 14 belonging to a second group. The computer, while operating as a source node 12, may therefore establish an order of synchronizing particular objects according to priority, and may perform the techniques discussed herein (such as the exemplary method 120 of FIG. 8) upon updated objects 14 in turn according to the priorities thereof.

A seventh variation of this first aspect relates to the configuration of the computer (as a server or source node 12) to utilize a centralized object store and/or a centralized coordination of the swarm networking, such as a computing environment host 100. In one such variation, the computing environment host 100 may centrally track which nodes 18 store which objects 14, and may participate in the selection of swarm nodes 118 among neighbors in order to synchronize an updated object 14. For example, each node 18 may, upon identifying an updated object 14, first notify the computing environment host 100. The computing environment host 100 may then be queried by any node 18 as to which neighbors are storing the updated object 14, and the response may be used to form the swarm network 116. In another such variation, the computing environment host 100 may serve as an authoritative source of the object set; e.g., the computing environment host 100 may provide a latest version of an object 14 on demand, may resolve versioning conflicts, and/or may serve as a reliable source of an object 14 if other nodes 18 storing the object 14 are unavailable. Accordingly, where the objects 14 in the object store 166 of the computer are also stored as corresponding objects in an object store 166 of a computing environment host 100, the computer may be configured to, upon identifying an updated object 14, determine whether the computing environment host 100 is storing the updated object 14, and if not, send the updated object 14 to the computing environment host 100. Moreover, it may be advantageous to synchronize the updated object 14 with the computing environment host 100 before synchronizing the updated object 14 with neighbors. Those of ordinary skill in the art may implement additional features in the configuration of a computer (e.g., as a source node 12 or server) while implementing the techniques discussed herein.

A second aspect that may vary among embodiments of these techniques relates to the manner of configuring the computer to participate in a swarm network 116 formed for an updated object 14 stored by another source node 12. These variations may apply, e.g., while the computer functions as a client or swarm node 118 in the swarm network 116, such as in the exemplary method 140 of FIG. 9.

As a first variation of this second aspect, the computer may be configured to assist in the identification by the source node 12 of whether the computer stores the updated object 14. For example, the source node 12 may send to the computer an identifier (e.g., a name, distinctive location, GUID, or inode number) and a content indicator (e.g., a hashcode, version number, or last modification date of the object 14.) The computer may be configured to compare this information with the objects 14 in the object store 166 (and to a corresponding object 14 in the object store 166, if one exists.) The computer may then notify the source node 12 affirmatively if a matching object is located, if an object with the same identifier is of a later version, etc., or negatively if no such object is found, and the updated object 14 is to be received by the computer and stored in the object store 166.

As a second variation of this second aspect, the computer may be configured to participate in a swarm network 116 by notifying the other swarm nodes 118 and/or the source node 12 upon receiving a chunk of the object 14. This may be helpful, e.g., for facilitating the distribution of chunks delivered to the computer, such as by enabling the source node 12 and/or other swarm nodes 118 to update a swarm chunk map 192 to indicate the set of chunks stored by the computer. Additionally, the computer may be configured to participate in a swarm network 116 by initializing, maintaining, and using a swarm chunk map 192 indicating which swarm nodes 118 are storing which chunks of the updated object 14. This swarm chunk map 192 may be generated and used in a similar manner as the source node 12. For example, upon joining the swarm network 116, the computer may initialize a swarm chunk map 192, and upon notified that another swarm node 118 is storing a particular chunk, the computer may update the swarm chunk map 192 to indicate that the swarm node 118 is storing the chunk. This swarm chunk map 192 may be used, e.g., to determine when the swarm nodes 118 have received the chunks, and to facilitate the selection of chunks to be sent to various swarm nodes 118 (e.g., by selecting a rare chunk that is stored by the computer, but that is infrequently stored by the other swarm nodes 118.)

A third variation of this second aspect relates to the manner whereby the computer, while participating in the swarm network 116, delivers chunks to other swarm nodes 118. As a first example, the computer may simply send one chunk to one swarm node 118 at a time, and may select and send a subsequent chunk to a swarm node 118 upon completing the sending of the current chunk. As a second example, the computer may concurrently send one or more chunks to one or more swarm nodes. In one such embodiment, the computer may enqueue chunks to be sent to various swarm nodes 118. Upon being notified of the formation of the swarm network comprising the computer, the computer may be configured to generate a send queue for respective swarm nodes 118. Chunks may then be sent to respective swarm nodes 118 by enqueuing one or more chunk in the send queue of the swarm node 118. Upon enqueuing a chunk in an empty send queue of the swarm node 118, or upon completing sending the chunk to the swarm node (after dequeuing a sent chunk from the send queue), the computer may identify a next enqueued chunk in the send queue for the swarm node 118, and may initiate sending the next enqueued chunk. This embodiment may promote a steady stream of redistributed chunks to respective swarm nodes 118, and may also maintain a high utilization of the upload capacity of the computer. As one additional refinement, the computer may, upon identifying a next enqueued chunk, examine the swarm chunk map 192 to determine whether the swarm node 118 has already received the next enqueued chunk; if so, the computer may simply dequeue the enqueued chunk without sending it to the swarm node 118. Those of ordinary skill in the art may devise other improvements and features whereby the computer may be configured to participate as a swarm node 118 in a swarm network 116 while implementing the techniques discussed herein.

A third aspect that may vary among embodiments of these techniques relates to an additional configuration of the nodes 18 to achieve a synchronization of respective object stores 166 where the swarm network techniques might not succeed. As may be appreciated with regard to FIG. 7, the swarm network techniques discussed herein are likely to succeed in propagating an updated object 14 to all nodes 18 within particular conditions, such as an unpartitioned network 16, a set of neighbor selections that fully cover the nodes 18, and unbroken network connectivity of all nodes 18. However, if these conditions fail, the swarm network techniques may fail to propagate the updated object 14 to one or more nodes 18. As a first example, the network 16 may be partitioned into two or more partitions of nodes 18, where no node of a first partition is accessible to any node of another partition. This partitioning may occur, e.g., through connectivity failures, bridge nodes dropping offline, or an improperly chosen network topology. In this scenario, an updated object 14 may be propagated among the nodes 18 of a first partition, but cannot be propagated to any of the nodes 18 of the second partition. Moreover, the nodes 18 of the second partition may not even be notified that the object 14 has been updated. As a second example, an inadequate neighbor selection algorithm that is utilized by the nodes 18 to form swarm networks 116 may inadvertently exclude one or more nodes 18 from any neighbor set (e.g., where a first node is only accessible to a second node that fails to include the first node in its neighbor set.) In this scenario, the excluded node 18 is not included in any swarm network 116 and does not receive the updated object 14, and may not even be notified of the updated object 14. As a third example, a node 18 may temporarily go offline when an updated object 14 is being propagated though the nodes 18 by swarm networks 116, and may not receive the updated object 14 or even a notification that the object 14 has been updated.

In these and other scenarios, additional techniques may be utilized to promote the synchronization of the object sets stored by various nodes 18 when the swarm network techniques cannot achieve such synchronization. As one such example, the computer may be configured, upon detecting a synchronization event that might indicate a loss of updates or an opportunity to obtain a missing of updates (e.g., reconnecting to a network 16, detecting a partitioning or de-partitioning of the network 16, or choosing a new set of neighbors), endeavor to identify and obtain updated objects 14. The computer may then ask nodes 14 (such as neighbors) to identify updated objects 14, and may ask such nodes 14 storing any identified updated objects 14 to send the updated object 14 to the computer. Thus, in contrast with the "telling' and "pushing" architecture of delivering updated objects 14 to neighbors exhibited by the swarm networks 116, this supplemental technique exhibits an "ask" architecture (whereby the node asks nearby nodes for updated objects 14) and a "pull" architecture (whereby the node initiates the request to receive the updated object 14 from one or more nodes storing the updated object 14.) Thus, the node 18 controlling the interaction acts as a client that solicits updated objects 14 (or chunks thereof) from nodes 18 acting as servers of the updated objects 14.

Figure 13:
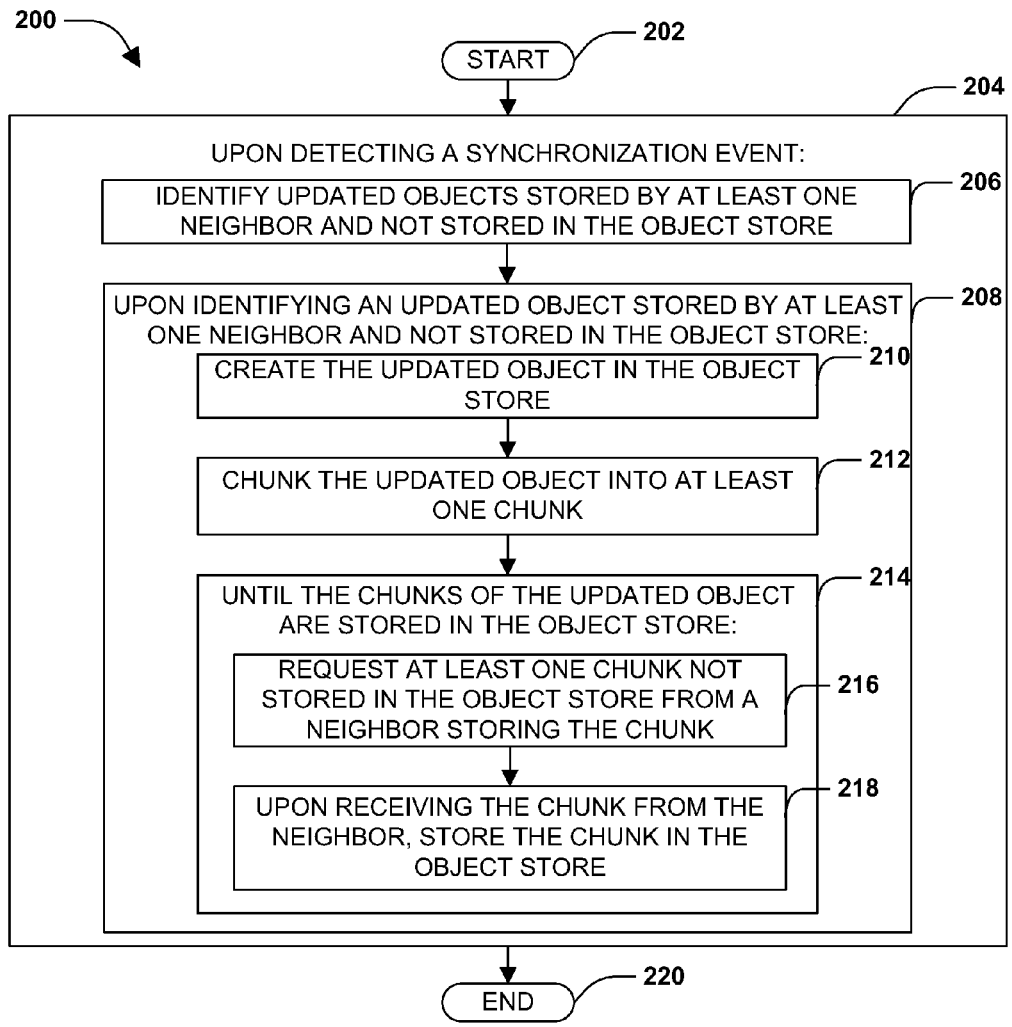
FIG. 13 is a flow chart illustrating another exemplary method of synchronizing an updated object of an object set stored by a computer with corresponding objects stored by at least one node accessible over a network.

FIG. 13 illustrates one embodiment of this technique, comprising an exemplary method 200 of synchronizing the objects 14 of the object store 166 of the computer with corresponding updated objects 14 stored in the object stores 166 of other nodes 18. This embodiment may be added, e.g., to other embodiments of these techniques (e.g., the exemplary method 120 of FIG. 8 or the exemplary system 168 of FIG. 10.) The exemplary method 200 begins at 202 an involves, upon detecting 204 a synchronization event, identifying 206 updated objects 14 stored by at least one neighbor and not stored in the object store 166 of the computer. Upon identifying 208 one or more such updated objects 14, the exemplary method 200 involves creating 210 the updated object 14 in the object store 166 of the computer and chunking 212 the updated object 14 into at least one chunk. (Alternatively, this chunking 212 might be performed by another computer, e.g., the source node 12 of the updated object 14, which may notify the computer of the chunks of the object 14.) The exemplary method 200 also involves, until 214 the chunks of the updated object 14 are stored in the object store 166, requesting 216 at least one chunk not stored in the object store 166 from a neighbor storing the chunk, and upon receiving the chunk from the neighbor, store the chunk in the object store 166. The computer may continue requesting chunks of the updated object 14 from neighbors storing such chunks until the updated object 14 has been received and stored, whereby the exemplary method 200 ends at 220.

Alternatively or additionally, embodiments may be configured to support the delivery of updated objects 14 to nodes 18 that request such updated objects 14 (e.g., by operating as a server of updated objects 14, or chunks thereof, that may be requested by client nodes utilizing the exemplary method 200 of FIG. 13.) For example, a computer may be configured to, upon receiving from a neighbor a request for a chunk of an object 14 stored in the object store 166 of the computer, send the chunk of the object 14 to the neighbor. Additionally, a computer may, while seeking to identify updated objects 14 stored by other nodes 18, identify one or more updated objects 14 stored in its object store 166 that are to be delivered to the other nodes 18. For example, the computer may have updated an object 14 in the object store 166 while offline, and upon reconnecting with the network 16, may identify the object 14 as having been locally updated while inquiring about updated objects 14 stored by other nodes 18. In this scenario, the computer may identify the object 14 as an updated object 14, thereby invoking the "tell" and "push" techniques for synchronizing updated objects 14, such as the exemplary method 120 of FIG. 8. Those of ordinary skill in the art may devise many ways of synchronizing object sets that may supplement the swarm network synchronization while implementing the techniques discussed herein.

A fourth aspect that may vary among embodiments of these techniques relates to the participation of a computing environment host 100 in these techniques, and in particular in the "ask" and "pull" synchronization techniques. A first variation of this fourth aspect involves an interaction of such embodiments with a computing environment host 100, which may facilitate the synchronization of the updated objects 14 from other nodes 18. The computing environment host 100 may store a list of updated objects 14 stored by various nodes 18, including the computer. When the computer detects a synchronization event, the computer may request from the computing environment host 100 a record of the objects 14 that have been updated, but that are not stored in the object store 166 of the computer. This record may be obtained, e.g., if respective nodes 18 are configured to notify the computing environment host 100 upon storing an updated object 14 in its object store 166. The computing environment host 100 may identify and provide such a list, e.g., by comparing its record of the object set 14 stored by the computer against the object set 14 stored by other nodes 18, including by the computing environment host 100. The result of the comparison may identify the updated objects 14, and may also identify the nodes 18 storing such updated objects 14 that may be provided upon request by the computer. Alternatively, the computing environment host 100 may maintain a log of updated objects 14 stored by the nodes 18, and may send to the computer the portion of the log since the computer was last known to have been synchronized with the other nodes 18 (e.g., since the last network synchronization event detected by the computer.) The computer may then examine the portion of the log to identify any updated objects 14 that are not stored in the object store 166 of the computer. Alternatively, if the object set is not managed by a computing environment host 100, other techniques may be used to identify updated objects 14; e.g., the computer may request from neighbors a list of recently updated objects 14, or may compare the objects 14 stored in its object store 166 with the objects 14 stored in the object stores 166 of neighbors.

A second variation of this fourth aspect involves another interaction of the computer with the computing environment host 100 as an alternative source of updated objects 14 or chunks thereof. In some scenarios, the computer may more easily obtain an updated object 14 from the computing environment host 100 than from any of the nodes 18. As a first example, the nodes 18 storing an updated object 14 may be accessible to the computer over a slower network connection than may be achieved by directly contacting the computing environment host 100 (e.g., where the uplink from the nodes 18 has limited upload capacity, as occasionally describes a home network connected through a residential broadband connection.) As a second example, the nodes 18 storing the updated object 14 may not be accessible at all to the computer, such as when these nodes 18 lose network connectivity, or when a network partition isolates these nodes 18 in a partition apart from the computer. In these cases, the computer may resort to requesting an updated object 14 or a chunk thereof from the computing environment host 100. For example, the computer may be configured to, upon failing to receive at least one chunk of an updated object 14 from its neighbors, request the at least one chunk from the computing environment host 100 and, upon receiving the at least one chunk from the computing environment host 100, store the at least one chunk in the object store 166. It may be advantageous to configure the nodes 18 to make such requests only as a last resort in order to conserve the network capacity and processing resources of the computing environment host 100, but configuring the computer to exercise this option may be desirable over a protracted period where the object 14 stored by the computer is not synchronized with the latest updates to the object 14.

A third variation of this fourth aspect involves utilizing the computing environment host 100 to mediate version conflicts. In many scenarios, an object 14 may have been concurrently and differently updated by two nodes 18, and it may be difficult to reconcile the updates and to prioritize one version of the object 14 over the other. For example, a first node 18 may update its local representation of an object 14 while the node 18 is disconnected from the network 16, during which period a second node 18 may differently update its local representation of the same object 14. When the first node 18 reconnects to the network 16, it may discover the conflicting updating of the object 14 by the second node 18. In such scenarios, the nodes 18 may refer to the computing environment host 100 to mediate the version conflict, since the computing environment host 100 may host the authoritative representation of the object set. The computing environment host 100 may respond by choosing one version over the other based on various factors (e.g., the version most recently updated, or a version of the object 14 updated on a higher priority device over a version of the object 14 updated on a lower priority node device.) Alternatively, the computing environment host 100 may attempt to reconcile or merge the different updates to the object 14, and may generate a hybrid object to be distributed to the nodes 18. As other alternatives, the computing environment host 100 may indicate that both versions of the object 14 are to be stored (e.g., by renaming at least one of the versions of the object 14), or may ask a user to choose a version. Those of ordinary skill in the art may devise many uses of a computing environment host 100 relating to the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 14:
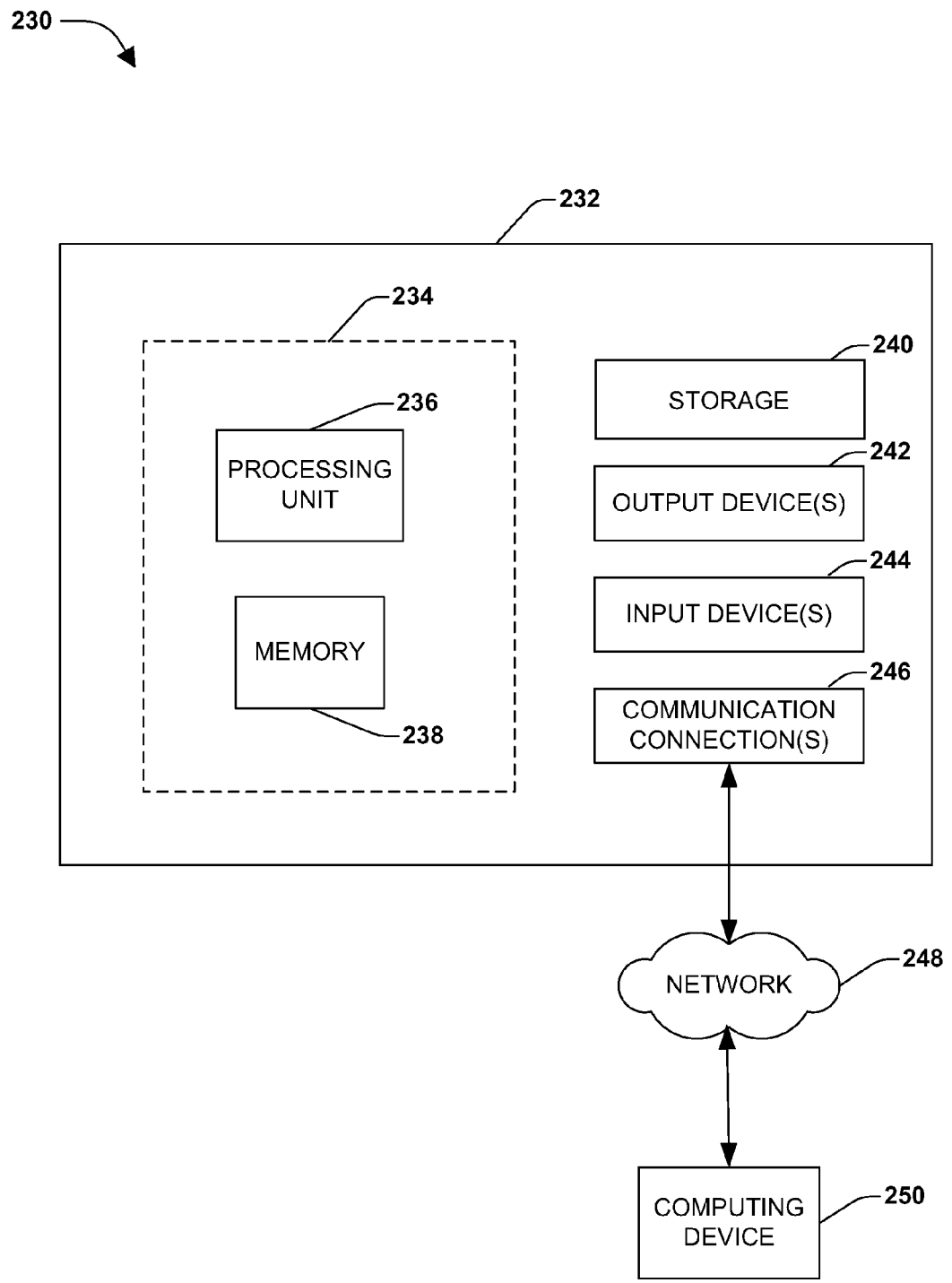
FIG. 14 illustrates an exemplary computing environment wherein one or more of the provisions set forth herein may be implemented.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 230 comprising a computing device 232 configured to implement one or more embodiments provided herein. In one configuration, computing device 232 includes at least one processing unit 236 and memory 238. Depending on the exact configuration and type of computing device, memory 238 may be volatile (such as RAM, for example), non-volatile (such as ROM, flash memory, etc., for example) or some combination of the two. This configuration is illustrated in FIG. 14 by dashed line 234.

In other embodiments, device 232 may include additional features and/or functionality. For example, device 232 may also include additional storage (e.g., removable and/or non-removable) including, but not limited to, magnetic storage, optical storage, and the like. Such additional storage is illustrated in FIG. 14 by storage 240. In one embodiment, computer readable instructions to implement one or more embodiments provided herein may be in storage 240. Storage 240 may also store other computer readable instructions to implement an operating system, an application program, and the like. Computer readable instructions may be loaded in memory 238 for execution by processing unit 236, for example.

The term "computer readable media" as used herein includes computer storage media. Computer storage media includes volatile and nonvolatile, removable and non-removable media implemented in any method or technology for storage of information such as computer readable instructions or other data. Memory 238 and storage 240 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 232. Any such computer storage media may be part of device 232.

Device 232 may also include communication connection(s) 246 that allows device 232 to communicate with other devices. Communication connection(s) 246 may include, but is not limited to, a modem, a Network Interface Card (NIC), an integrated network interface, a radio frequency transmitter/receiver, an infrared port, a USB connection, or other interfaces for connecting computing device 232 to other computing devices. Communication connection(s) 246 may include a wired connection or a wireless connection. Communication connection(s) 246 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 232 may include input device(s) 244 such as keyboard, mouse, pen, voice input device, touch input device, infrared cameras, video input devices, and/or any other input device. Output device(s) 242 such as one or more displays, speakers, printers, and/or any other output device may also be included in device 232. Input device(s) 244 and output device(s) 242 may be connected to device 232 via a wired connection, wireless connection, or any combination thereof. In one embodiment, an input device or an output device from another computing device may be used as input device(s) 244 or output device(s) 242 for computing device 232.

Components of computing device 232 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 232 may be interconnected by a network. For example, memory 238 may be comprised of multiple physical memory units located in different physical locations interconnected by a network.

Those skilled in the art will realize that storage devices utilized to store computer readable instructions may be distributed across a network. For example, a computing device 250 accessible via network 248 may store computer readable instructions to implement one or more embodiments provided herein. Computing device 232 may access computing device 250 and download a part or all of the computer readable instructions for execution. Alternatively, computing device 232 may download pieces of the computer readable instructions, as needed, or some instructions may be executed at computing device 232 and some at computing device 250.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of synchronizing objects of an object set stored by a computer having a processor with corresponding objects of object sets stored by at least one node accessible over at least one network, the method comprising:
 executing on the processor instructions configured to:
  select from the nodes a neighbor set comprising at least one neighbor that is accessible over the at least one network to the computer and other neighbors of the neighbor set; and
  upon detecting an update of an updated object in the object set:
   determine the neighbors in the neighbor set that are not storing the updated object;
   form a swarm network of swarm nodes comprising the neighbors not storing the updated object;
   notify the swarm nodes of the swarm network formed for the updated object; and
   send the updated object to the swarm nodes using the swarm network.

2. The method of claim 1, the instructions configured to select the neighbor set upon detecting at least one network change event.

3. The method of claim 1, selecting the neighbor set comprising:
 enumerating the nodes of the network, and
 for respective nodes, selecting a neighbor set comprising the nodes of the network enumerated according to the formula:

$$S_i = n \operatorname{xor} 2^i | 0 \leq i < \operatorname{ceiling}(\log_2(N)), n \operatorname{xor} 2^i < N,$$

wherein:
 $S_i$ represents neighbor i of the node;
 n represents the enumeration of the node; and
 N represents the number of nodes in the network.

4. The method of claim 1, determining the neighbors that are not storing the updated object comprising:
 for respective neighbors:
  sending to the neighbor an identifier of the updated object and a content indicator of the updated object, and
  receiving from the neighbor a notification whether the neighbor is storing the updated object.

5. The method of claim 1, sending the updated object to the swarm nodes comprising:
 chunking the updated object into at least one chunk;
 initializing a swarm chunk map indicating whether respective swarm nodes are storing respective chunks of the updated object; and
 until the swarm chunk map indicates that the swarm nodes have received the chunks:
  sending a chunk to a swarm node not storing the chunk according to the swarm chunk map, and upon receiving from a swarm node a notification of storing a chunk, updating the swarm chunk map to indicate that the swarm node is storing the chunk; and upon determining from the swarm chunk map that the swarm nodes have received the chunks, terminating the swarm network.

6. The method of claim 1, the instructions configured to, upon identifying a second chunk that is not stored in the object store and that is identical to a first chunk that is stored in the object store, duplicate the first chunk in the object store as the second chunk.

7. The method of claim 1:

the instructions configured to: upon identifying an updated object in the object set, add the updated object to an updated object batch comprising updated objects not stored by the neighbors; and forming the swarm network comprising: form the swarm network when the updated object batch exceeds an object batch threshold.

8. The method of claim 1:

the objects stored as corresponding objects in an object store of a computing environment host; and the instructions configured to, upon identifying the updated object:

determine whether the computing environment host is storing the updated object, and upon determining that the computing environment host is not storing the updated object, send the updated object to the computing environment host.

9. The method of claim 1, the instructions configured to:

upon being notified by a neighbor of an updated object comprising an identifier and a content indicator:

compare the identifier and the content indicator of the updated object to a corresponding object in the object store, and send to the neighbor a notification whether the computer is storing the updated object.

10. The method of claim 1, the instructions configured to, upon being notified of a formation by a source of a swarm network comprising the computer for an updated object:

create a corresponding updated object in the object store;

until the swarm nodes have received the object:

upon receiving the object, store the object in the object store, and send the object to a swarm node not storing the object; and upon determining that the swarm nodes have received the object, terminating the swarm network.

11. The method of claim 10:

the instructions configured to, upon being notified of a formation by a source of a swarm network comprising the computer for an updated object, create a swarm chunk map indicating whether respective swarm nodes are storing respective chunks of the updated object;

receiving the object comprising:

upon receiving a chunk:

storing the chunk in the object store, and updating the swarm chunk map to indicate that the computer is storing the chunk;

sending the object comprising:

until the swarm nodes have received the chunks of the object:

sending a chunk to a swarm node not storing the chunk according to the swarm chunk map, and updating the swarm chunk map to indicate that the swarm node is storing the chunk; and determining that the swarm nodes have received the object comprising:

determining according to the swarm chunk map that the swarm nodes have received the chunks.

12. The method of claim 11, sending the chunk to the swarm node comprising:

selecting a chunk that is stored in the object store and that is stored by fewer of the swarm nodes according to the swarm chunk map than other chunks of the updated object, and sending the chunk to a swarm node not storing the chunk according to the swarm chunk map.

13. The method of claim 11:

receiving a chunk comprising: notifying the swarm nodes and the source that the computer is storing the chunk; and the instructions configured to, upon being notified that a swarm node is storing a chunk, update the swarm chunk map to indicate that the swarm node is storing the chunk.

14. The method of claim 11:

the instructions configured to: upon being notified of the formation of the swarm network comprising the computer, generate a send queue for respective swarm nodes; and sending the chunk to the swarm node comprising:

enqueuing the chunk in the send queue of the swarm node;

upon enqueuing the chunk in an empty send queue of the swarm node, initiating sending the chunk to the swarm node; and upon completing sending a chunk to the swarm node:

dequeuing the chunk from the send queue, and upon identifying a next enqueued chunk in the send queue of the swarm node, initiating sending the next enqueued chunk in the send queue to the swarm node.

15. The method of claim 1, the instructions configured to, upon detecting a synchronization event:

identify updated objects stored by at least one neighbor and not stored in the object store of the computer; and upon identifying an updated object stored by at least one neighbor and not stored in the object store of the computer:

create the updated object in the object store;

chunk the updated object into at least one chunk; and until the chunks of the updated object are stored in the object store:

request at least one chunk not stored in the object store from a neighbor storing the chunk, and upon receiving the chunk from the neighbor, store the chunk in the object store.

16. The method of claim 15, the instructions configured to, upon receiving from a neighbor a request for a chunk of an object stored in the object store of the computer, send the chunk of the object to the neighbor.

17. The method of claim 15:

the objects stored as corresponding objects in an object store of a computing environment host; and identifying the updated objects comprising: requesting from the computing environment host a list of updated objects stored in the object store of the computing environment host and not stored in the object store of the computer.

18. The method of claim 17, the instructions configured to, upon failing to receive at least one chunk of an updated object from the neighbors:

request the at least one chunk from the computing environment host, and upon receiving the at least one chunk from the computing environment host, store the at least one chunk in the object store.

19. A system configured to synchronize an updated object of an object set stored by a computer with corresponding objects of object sets stored by at least one node accessible over at least one network, the system comprising:

a neighbor selecting component configured to select from the nodes a neighbor set comprising at least one neighbor that is accessible over the at least one network to the computer and other neighbors of the neighbor set;

a swarm network forming component configured to, upon detecting an update of an updated object of the object set:

determine the neighbors in the neighbor set that are not storing the updated object, form a swarm network of swarm nodes comprising the neighbors not storing the updated object, and notify the swarm nodes of the swarm network formed for the updated object; and a swarm network sending component configured to send the updated object to the swarm nodes using the swarm network.

20. A computer-readable nonvolatile storage medium configured to store instructions that, when executed by at least one processor of a computer storing an object set comprising objects corresponding to objects of object sets stored by at least one node accessible over at least one network and stored as corresponding objects in an object store of a computing environment host, cause the at least one processor to synchronize the objects of the object set by:

upon detecting at least one network change event, selecting from the nodes a neighbor set comprising at least one neighbor by:

enumerating the nodes of the network, and for respective nodes, selecting a neighbor set comprising the nodes of the network enumerated according to the formula:

$$S_i = n \text{xor} 2^i | 0 \leq i < \text{ceiling}(\log_2(N)), n \text{xor} 2^i < N,$$

wherein:

$S_i$ represents neighbor i of the node;

n represents the enumeration of the node; and

N represents the number of nodes in the network;

upon identifying a small updated object set comprising a small number of small updated objects to be delivered to a small neighbor set, send the small updated object set to the neighbors of the small neighbor set; upon identifying an updated object in the object set exceeding a small updated object set:

determining the neighbors that are not storing the updated object by, for respective neighbors:

sending to the neighbor an identifier of the updated object and a content indicator of the updated object, and receiving from the neighbor a notification whether the neighbor is storing the updated object forming a swarm network of swarm nodes comprising the neighbors not storing the updated object;

notifying the swarm nodes of the swarm network formed for the updated object; and sending the updated object to the swarm nodes using the swarm network by:

chunking the updated object into at least one chunk;

initializing a swarm chunk map indicating whether respective swarm nodes are storing respective chunks of the updated object; and until the swarm chunk map indicates that the swarm nodes have received the chunks:

sending a chunk to a swarm node not storing the chunk according to the swarm chunk map, and upon receiving from a swarm node a notification of storing a chunk, updating the swarm chunk map to indicate that the swarm node is storing the chunk; and upon determining from the swarm chunk map that the swarm nodes have received the chunks, terminating the swarm network;

determine whether the computing environment host is storing the updated object; and upon determining that the computing environment host is not storing the updated object, send the updated object to the computing environment host;

upon being notified by a neighbor of an updated object comprising an identifier and a content indicator:

compare the identifier and the content indicator of the updated object to a corresponding object in the object store, and send to the neighbor a notification whether the computer is storing the updated object;

upon being notified of a formation by a source of a swarm network comprising the computer for an updated object:

create a corresponding updated object in the object store;

generate a send queue for respective swarm nodes;

create a swarm chunk map indicating whether respective swarm nodes are storing respective chunks of the updated object;

until the swarm nodes have received the chunks of the object:

upon receiving a chunk of the object:

store the chunk in the object store, update the swarm chunk map to indicate that the computer is storing the chunk, and notify the swarm nodes and the source that the computer is storing the chunk;

upon being notified that a swarm node is storing a chunk, update the swarm chunk map to indicate that the swarm node is storing the chunk;

send the chunk to a swarm node not storing the chunk according to the swarm chunk map by:

selecting a chunk that is stored in the object store and that is stored by fewer of the swarm nodes according to the swarm chunk map than other chunks of the updated object;

enqueuing the chunk in the send queue of the swarm node;

upon enqueuing the chunk in an empty send queue of the swarm node, initiating sending the chunk to the swarm node; and upon completing sending a chunk to the swarm node:

dequeuing the chunk from the send queue, and upon identifying a next enqueued chunk in the send queue of the swarm node, initiating sending the next enqueued chunk in the send queue to the swarm node; and updating the swarm chunk map to indicate that the swarm node is storing the chunk; and upon determining according to the swarm chunk map that the swarm nodes have received the chunks, terminate the swarm network;

upon detecting a synchronization event:
- identify updated objects stored by at least one neighbor and not stored in the object store of the computer by requesting from the computing environment host a list of updated objects stored in the object store of the computing environment host and not stored in the object store of the computer;
- upon identifying an updated object stored by at least one neighbor and not stored in the object store of the computer:
    - create the updated object in the object store;
    - chunk the updated object into at least one chunk; and
    - upon failing to receive at least one chunk of an updated object from the neighbors:
        - request the at least one chunk from the computing environment host, and
        - upon receiving the at least one chunk from the computing environment host, store the at least one chunk in the object store;
    - until the chunks of the updated object are stored in the object store:
        - request at least one chunk not stored in the object store from a neighbor storing the chunk, and
        - upon receiving the chunk from the neighbor, store the chunk in the object store; and
- for objects stored in the object set of the computer that are not stored in the object set of at least one neighbor, identify the object as an updated object; and upon receiving from a neighbor a request for a chunk of an object stored in the object store of the computer, send the chunk of the object to the neighbor.

* * * * *